US012754647B2

(12) United States Patent
Binstead

(10) Patent No.: US 12,754,647 B2
(45) Date of Patent: Oct. 6, 2026

(54) ELEMENT ARRANGEMENT AND ASSOCIATED METHOD OF MANUFACTURE

(71) Applicant: Ronald Peter Binstead, Beeston (GB)

(72) Inventor: Ronald Peter Binstead, Beeston (GB)

( * ) Notice: Subject to any disclaimer, the term of this patent is extended or adjusted under 35 U.S.C. 154(b) by 264 days.

(21) Appl. No.: 18/686,617

(22) PCT Filed: Aug. 26, 2022

(86) PCT No.: PCT/GB2022/052206
§ 371 (c)(1),
(2) Date: Feb. 26, 2024

(87) PCT Pub. No.: WO2023/026062
PCT Pub. Date: Mar. 2, 2023

(65) Prior Publication Data

US 2025/0138691 A1 May 1, 2025

(30) Foreign Application Priority Data

Aug. 27, 2021 (GB) ..................................... 2112315
Sep. 15, 2021 (GB) ..................................... 2113191

(51) Int. Cl.
*G06F 3/047* (2006.01)
*G06F 3/041* (2006.01)
*G06F 3/044* (2006.01)

(52) U.S. Cl.
CPC .......... *G06F 3/047* (2013.01); *G06F 3/04164* (2019.05); *G06F 3/044* (2013.01)

(58) Field of Classification Search
CPC ....... G06F 3/04164; G06F 3/044; G06F 3/047
See application file for complete search history.

(56) References Cited

U.S. PATENT DOCUMENTS 8,115,738 B2 * 2/2012 Ito ......................... G06F 1/1616 345/173
9,122,358 B2 * 9/2015 Liu ....................... G06F 3/0446
(Continued)

FOREIGN PATENT DOCUMENTS

CN 203366301 U 12/2013
CN 112558806 A * 3/2021 ........... G06F 3/0448
(Continued)

OTHER PUBLICATIONS

Machine translation of CN-112558806-A. (Year: 2026).*
(Continued)

*Primary Examiner* — Michael Pervan
(74) *Attorney, Agent, or Firm* — Bradley J. Thorson; DeWitt LLP

(57) ABSTRACT

The disclosure relates to a conductor arrangement comprising: an active region bounded by at least one edge region that extends in an edge region direction; and a plurality of conductive elements that each extend through the active region in a direction that is oblique to the edge region direction, in which the plurality of conductive elements comprises a first set of conductive elements and a second set of conductive elements, in which each conductive element of the first set of conductive elements is electrically connected to a corresponding conductive element of the second set of conductive elements at the at least one edge region to provide respective connected pairs of conductive elements, in which each pair of conductive elements is configured to be coupled to circuitry via the at least one edge region.

18 Claims, 22 Drawing Sheets

(56) References Cited

U.S. PATENT DOCUMENTS

| | | | | |
|---|---|---|---|---|
| 10,534,487 | B2 * | 1/2020 | Binstead | G06F 3/047 |
| 2008/0225011 | A1 * | 9/2008 | Ito | G06F 1/1643 345/173 |
| 2014/0375902 | A1 | 12/2014 | Westhues et al. | |
| 2015/0022470 | A1 | 1/2015 | Lee | |
| 2015/0317010 | A1 | 11/2015 | Yashiro et al. | |
| 2016/0209954 | A1 * | 7/2016 | Cho | G06F 3/0446 |
| 2018/0059850 | A1 * | 3/2018 | Kerr | G01L 5/228 |
| 2018/0217696 | A1 * | 8/2018 | Binstead | G06F 3/0446 |

FOREIGN PATENT DOCUMENTS

| | | | | |
|---|---|---|---|---|
| GB | 2541336 | | 2/2017 | |
| KR | 2016/0088533 | A | 7/2016 | |
| KR | 1020160088533 | A | 7/2016 | |
| WO | 2015/185879 | A1 | 12/2015 | |
| WO | 2017/013437 | A1 | 1/2017 | |
| WO | WO-2018039360 | A1 * | 3/2018 | G06F 3/044 |
| WO | 2023/026062 | A1 | 3/2023 | |

OTHER PUBLICATIONS

Intellectual Property Office GB, Jack Bayntun, Patents Act 1977: Examination Report under Section 18(3), for Application No. GB2112315.3, dated Jun. 24, 2024, 3 pages.

Intellectual Property Office GB, Gareth Stephens, Patents Act 1977: Intention to Grant under Section 18(4), for Application No. GB2112315.3, dated Aug. 2, 2024, 2 pages.

UKIPO Examination Report under Section 18(3) dated Dec. 16, 2025, from Corresponding related App. No. GB2404357.2 (GB2625035A), 7 pages.

* cited by examiner

Touchscreen made using fine, insulated wire.

7 inputs -> 18 Xovers

Extra low resistance Touchscreen
made using loops of fine, insulated wire.

Extra low resistance Touchscreen made using loops of fine, insulated wire.
7 inputs -> 21 Xovers 7 inputs -> 21 Xovers Extra low resistance Touchscreen made using loops of fine, insulated wire, terminated with printed traces.

Extra low resistance Touchscreen made using loops of fine, insulated wire, terminated with printed traces.

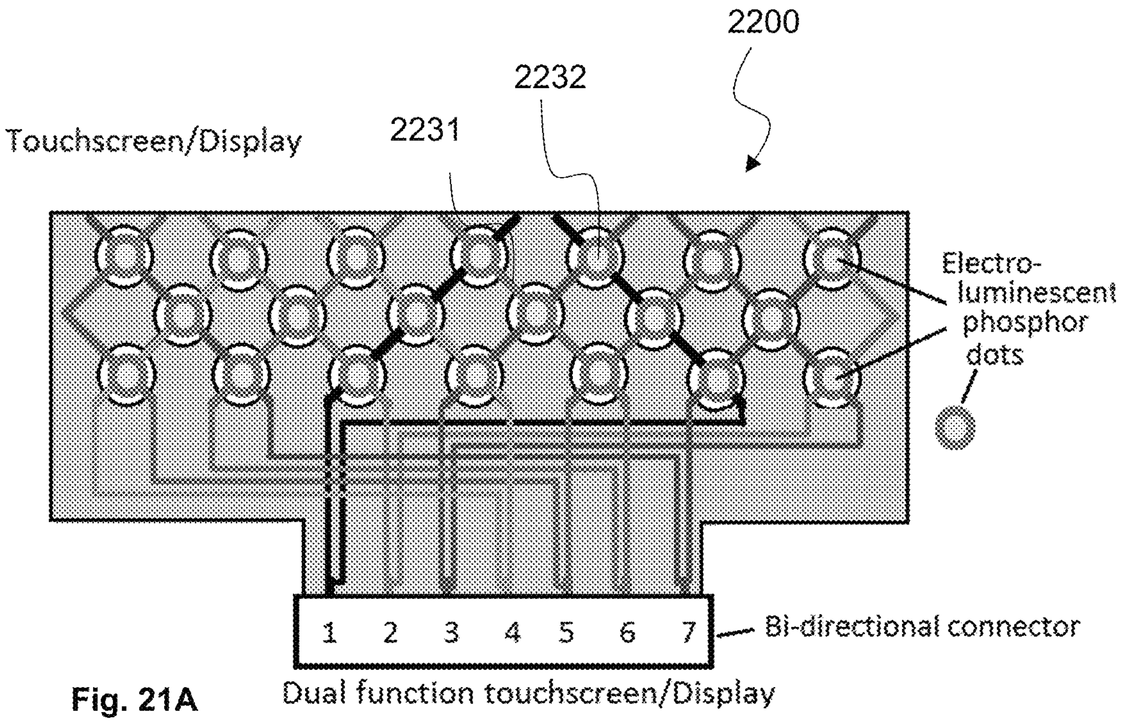
Fig. 21A Dual function touchscreen/Display
Touchscreen made using fine, insulated wire
and over-printed with electro-luminescent phosphor dots .

ELEMENT ARRANGEMENT AND ASSOCIATED METHOD OF MANUFACTURE

CROSS-REFERENCED TO RELATED APPLICATIONS

This application claims priority from Application PCT/GB2022/052206, filed Aug. 26, 2022, and claims priority from Great Britain Patent Application No. 2112315.3, filed Aug. 27. 2021, and claims priority from Great Britain Patent Application No. 2113191.7, filed Sep. 15, 2021, which is deemed incorporated by reference in its entirety in this application.

STATEMENT REGARDING FEDERALLY SPONSORED RESEARCH OR DEVELOPMENT

Not applicable.

BACKGROUND OF THE INVENTION

Technical Field

The disclosure generally relates to the field of element arrangements and associated methods of manufacture, including those for resistive, inductive, mechanical and capacitive touch sensors. In particular, although not exclusively, the disclosure relates to a touch sensor arrangement for increasing the practical size range and/or resolution of touch screens, keypad arrays and LED or electro-luminescent arrays or displays, memory devices, electro-mechanical actuators plus many other unspecified technologies.

Background

A major problem that limits the size of multi-touch, projected capacitance, resistive, and inductive touch-screens is the electrical resistance of the sensing elements in the screen.

Most touchscreens use a transparent array of horizontal (x), and vertical (y) sensing tracks that extend from one side of the screen to the opposite side.

FIG. 1 illustrates a schematic diagram of a conventional touch pad 100. The touch pad comprises horizontally extending conductive sensing elements 101, 102, 103 and vertically extending conductive sensing elements 104, 105, 106, 107. The horizontal and vertical conductive sensing elements 101-107 extend through a sensing region 120 and form a matrix of cross-over points, or sensing nodes, within the sensing region 120. The horizontally extending sensing elements 101-103 are coupled to a first connector 121 that extend along a first edge region at a periphery of the sensing region 120. The vertically extending sensing elements 104-107 are coupled to a second connector 122 that extends along a second edge region of the sensing region 120. The first edge region, and first connector 121, runs orthogonally to the second edge region, and second connector 122.

In order to attain high resolution between multiple independent fingers, the elements are divided up into many thin conductive traces less than 1 cm wide, the vertical and horizontal elements crossing each other at 90 degrees, but without any electrical contact.

These intersections are where touch sensing occurs when using "mutual capacitance" sensing, whereas it is the tracks themselves that sense when using "self-capacitance". "Self-capacitance" may be used for determining the unambiguous position of just one finger, the finger position being determined by the horizontal and vertical conductive elements that show a maximum change when the finger approaches. It may also be used for the detection of multiple fingers, but usually, though not always, with some degree of ambiguity. "Mutual capacitance" may be used to determine the unambiguous position of one or more fingers. In mutual capacitive methods, known techniques are employed that only enable intersections between sensing and controlling elements to detect a finger approaching that intersection. These intersections are called nodes. The remainder of these elements is insensitive to the approaching finger. The finger positions may be determined by finding intersections of the horizontal (x) and vertical (y) conductive elements that show a significant change in signal transmission between these elements (for example, from horizontal controllable to vertical sensing elements) when a finger approaches that intersection thereby causing a change in the capacitive coupling between these elements.

In the example illustrated in FIG. 1, the seven connections of the touch pad 100 may be coupled to appropriate electronic circuitry for operating the touch sensor 100. The seven horizontal and vertical inputs result in 12 crossover points, or sensing nodes (3×4). Although seven inputs are shown for clarity in the following description, it would be appreciated that the number of connections may be scalable to any number of horizontal and vertical elements. Table 1 provides a truth table showing the arrangement of sensing node for the touch sensor 100 of FIG. 1 with respect to connections (1-7) of the first electrical connector 121 and connections (1-7) of the second electrical connector.

TABLE 1

Truth table for 7 x/y inputs (3 × 4)

| | 1 | 2 | 3 | 4 | 5 | 6 | 7 |
|---|---|---|---|---|---|---|---|
| 1 | | | | X | X | X | X |
| 2 | | | | X | X | X | X |
| 3 | | | | X | X | X | X |
| 4 | X | X | X | | | | |
| 5 | X | X | X | | | | |
| 6 | X | X | X | | | | |
| 7 | X | X | X | | | | |

FIG. 2 illustrates a schematic diagram of another conventional touch sensor 200. The touch sensor 200 of FIG. 2 is similar to that described previously with reference to FIG. 1 in that it has seven touch sensing elements. However, in this example, there are two horizontally extending sensing elements 201, 202 connected to a first connector coupled to a first connector 221, and five vertically extending sensing elements 203-207 coupled to a second electrical connector 222. This arrangement results in 10 sensing nodes (2×5) and so provides a different aspect ratio for a sensing region 220 of the touch sensor 200.

Table 2 provides a truth table showing the arrangement of sensing node for the touch sensor 200 of FIG. 2 with respect to connections (1-7) of the first electrical connector 221 and connections (1-7) of the second electrical connector.

TABLE 2

Truth table for 7 x/y inputs (2 × 5)

| | 1 | 2 | 3 | 4 | 5 | 6 | 7 |
|---|---|---|---|---|---|---|---|
| 1 | | | X | X | X | X | X |
| 2 | | | X | X | X | X | X |

TABLE 2-continued

| Truth table for 7 x/y inputs (2 × 5) | | | | | | | |
|---|---|---|---|---|---|---|---|
| | 1 | 2 | 3 | 4 | 5 | 6 | 7 |
| 3 | X | X | | | | | |
| 4 | X | X | | | | | |
| 5 | X | X | | | | | |
| 6 | X | X | | | | | |
| 7 | X | X | | | | | |

Many different types of material can be used for making this x/y matrix of sensing elements. For example, Indium Tin Oxide (ITO) has been used traditionally, and has a resistance of about 50 ohms per square, restricting its use to relatively small applications. Metal mesh is commonly used for much larger touchscreens due to its greater physical flexibility and lower resistance of about 15 ohms per square. Whatever the material used, however, all touchscreens could be made much larger if the resistance of the sensing elements could be reduced.

SUMMARY

The structures disclosed herein may be provided for a number of different types of applications, including conductive structures, for example:

- capacitive proximity sensing—in capacitive touchscreens, touch pads and keypads; for capacitive near field communication (NFC), or in a proximity sensing camera;
- inductive circuits—for detecting conductive objects such as a metal stylus, in near field communication (NFC) or no-contact power transmission applications;
- display mechanisms when used in conjunction with embedded electroluminescent material, for example zinc sulphide doped with copper;
- heating—to eliminate condensation or to melt ice on a surface or to warm-up a nearby surface;
- memory devices,
- electro-mechanical actuators;
- plus many other unspecified technologies; or
- any combination of the above applications.

The structures disclosed herein may also be provided for a number of different types of non-conductive applications, such as fibre-optic, acoustic, hydraulic.

Although the specific examples described often relate to touch sensors, it will be appreciated that the same geometric arrangements can also be used in these other contexts. In the case of non-conductive applications, the conductors described with reference to touch sensors may be replaced with the corresponding non-conductive elements, such as a fibre-optic cable, acoustic line or hydraulic element.

According to a first aspect, there is provided a touch sensor comprising:

- a sensing region bounded by at least one edge region that extends in an edge region direction; and
- a plurality of conductive elements that each extend through the sensing region in a direction that is oblique to the edge region direction,
- wherein the plurality of conductive elements comprises a first set of conductive elements and a second set of conductive elements,
- wherein each conductive element of the first set of conductive elements is configured to be electrically connected to a corresponding conductive element of the second set of conductive elements at the at least one edge region to provide respective connected pairs of conductive elements, and
- wherein each pair of conductive elements is configured to be coupled to touch sensor circuitry via the at least one edge region.

One or more of the conductive elements may split into a plurality of sensing elements at the at least one edge region to provide the pairs of conductive elements. One or more of the plurality of conductive elements may have a sensing element in the sensing region and a connection portion in the at least one edge region. The sensing elements may comprise wire. The connection portion may comprise trace conductor on a printed circuit board.

Each conductive element of the first set of conductive elements may be electrically connected to a corresponding conductive element of the second set of conductive elements at the at least one edge region to provide respective connected pairs of conductive elements. The conductive elements may be sensing elements. Each pair of conductive elements may cross any element of a different pair of conductive elements no more than once. For example, the elements may not cross each other more than once if this would create ambiguity, which may be referred to an undesirable ambiguity.

One conductive element of a pair of conductive elements may not cross another conductive element of that same pair of conductive elements. One conductive element of a pair of conductive elements may not cross the same conductive elements as the other conductive element of that pair of conductive elements.

Each conductive element of the first set of conductive elements may be electrically connected to a corresponding conductive element of the second set of conductive elements via the at least one edge region to provide respective connected pairs of conductive elements. Each pair of conductive elements may be coupled to touch sensor circuitry via the at least one edge region.

In one or more examples, there are no electrical connections between respective pairs of conductive elements.

A plurality of nodes may be formed at points where conductive elements of the plurality of conductive elements cross one another. A set of conductive elements may comprise multiple conductive elements.

In one or more examples, each conductive element of the first set of conductive elements does not form, with the corresponding conductive element of the second set of conductive elements, a node within the sensing area. Each conductive element of the first set of conductive elements may not be electrically connected, with the corresponding conductive element of the second set of conductive elements, within the sensing area.

In one or more examples, one or more of the first set of conductive elements extends in the sensing region in a direction that is transverse to a direction in which one or more of the second set of conductive elements extends. One conductive element of a pair of conductive elements may not extend parallel with another conductive element of that pair of conductive elements.

The sensing region may be formed by a substrate comprising a first portion that has been joined to a second portion.

In one or more examples, one or more of the plurality of conductive elements have a sensing portion in the sensing region and a connection portion in the at least one edge region. The sensing portion of the one or more of the plurality of conductive elements comprise wire. The sensing portion may be made from a different material or have a different thickness than the connection portion. The sensing portion may be joined to the connection portion or the two portions may be integrally formed. The sensing portion may extends within the sensing region. The connection portion may be connected to the sensing portion. The connection portion may extend within the first edge region. The connection portion may be connected to an electrical connector. The connection portion of the one or more of the plurality of conductive elements may comprise trace conductor on a printed circuit board.

In one or more examples, the at least one edge region comprises a first edge region. The first and second set of conductive elements may be configured to be connected to circuitry only at or via the first edge region.

In one or more examples, the first and second sets of conductive elements form a matrix of nodes within the sensing region.

In one or more examples, the at least one edge region forms a periphery around the bounds of the matrix of nodes.

In one or more examples, pairs of conductive elements form respective loops.

In one or more examples, ends of conductive elements are joined to form a substantially three-dimensional conductive array.

The sensing region may be bounded by the first edge region and a second edge region, wherein the second edge region opposes the first edge region, wherein the sensing region of the sensing area is bounded by a third edge region that extends between the first edge region and the second edge region, wherein the sensing region is bounded by a fourth edge region that extends between the first edge region and the second edge region and opposes the third edge region. The third edge region may be joined to the fourth edge region such that the sensing region is provided on a three dimensional substrate.

Ends of conductive elements may be joined to form a three dimensional conductive array. The sensing region may be provided on a three dimensional substrate.

In one or more examples, ends of conductive elements are joined to form a substantially cylindrical conductive array.

In one or more examples, one or more of the conductive elements may each split into a plurality of sensing elements at the at least one edge region. The respective sensing elements of a particular conductive element may extend in opposing directions from the at least one edge region, through the sensing region, and may not cross one another within the sensing region.

For a plurality of conductive elements that each split into two sensing elements at the at least one edge region, a sensing element from a first conductive element may cross a sensing element from a second conductive element to form a node within the sensing area. A sensing element from the first conductive element may cross a sensing element from a second conductive element in a transverse direction, such as at an angle from 10 degrees to 90 degrees, such as 20 degrees, 40 degrees or 80 degrees. The sensing element from the first conductive element and the sensing element from the second conductive element may extend from a node in transverse directions. Pairs of sensing elements may extend in opposing, transverse or perpendicular directions.

A plurality of sensing elements that split from a particular conductive element may be coupled to an electrical connector located at the same at least one edge region. The electrical connector may be configured to provide electrical connections to one or more further sensing elements.

Sensing elements split from the one or more conductive elements may form an array of elements in the sensing region with one or more conductive elements that do not split. The array of elements in the sensing region may alternate between sensing elements split from the one or more conductive elements and the one or more conductive elements that do not split. The one or more conductive elements that do not split may be coupled to a further electrical connector located at the same at least one edge region, or a plurality of such further electrical connectors.

The sensing region may be bounded by a first edge region and a second edge region that opposes the first edge region. The plurality of conductive elements may extend within, or through, the sensing region from the first edge region. The sensing region of the sensing area may be bounded by a third edge region that extends between the first edge region and the second edge region. The sensing region may be bounded by a fourth edge region that extends between the first edge region and the second edge region and opposes the third edge region. The edge regions may form a periphery around the bounds of the matrix of cross over points.

One or more of the first and second sets of conductive elements may be sensing conductive elements, or may be controlling conductive elements at some times, and sensing conductive elements at other times. The first and second set of conductive elements may be connected to circuitry only at the first edge region.

Each conductive element (or pair of conductive elements) may cross over another conductive element (or pair of conductive elements) within the sensing region, at one unique sensing/controlling node, only once at most, for example if this would causes unwanted or unresolvable ambiguity.

The conductive elements comprise one or more of: an insulation coated metallic wire or a conductive track. The sensor may comprise circuitry connected to the conductive elements. The circuitry may be configured to determine one or more touch positions in the sensing area.

The wire may be enamel coated copper. The wire may be tungsten. The wire may have a diameter range from 5 microns to 50 microns. The wire may have a diameter range from 3 microns to 17 microns.

There may be provided a "no soldering" capacitive method for terminating enamel coated wires, whereby the wires are first plotted on adhesive coated plastic or paper, in a very tight pattern at the termination point, this pattern then being overprinted with conductive ink, using a stencil, screen printing, or ink-jet printing, a connector terminal then being placed over, and in direct electrical contact with the conductive ink, there being no direct electrical contact between the wire and the connector terminal.

There may be provided a "no soldering" method for terminating bare wires, whereby the wires are first plotted on adhesive coated plastic or paper, in a tight pattern at the termination point, this pattern then being overprinted with conductive ink, using a stencil, screen printing, or ink-jet printing, a connector terminal then being placed over, and in direct electrical contact with the conductive ink.

Terminating wires may be laid down on adhesive coated film. A printed circuit board (pcb) terminal strip may be placed on the adhesive film before the wire is plotted. The pcb may have conductors facing upward, in such a position whereby, as the wire(s) are plotted they run over the pcb in the places where the conductive traces are found. After the plotting is completed, the wires may be directly soldered to the conductive traces.

A pcb terminal strip may be placed on the adhesive film after the wire is plotted, the pcb having conductors facing downward, in such a position whereby, the plotted wire(s) run under the pcb in the places where the conductive traces are found. The wires may be soldered through the film to the conductive traces.

The touch sensor may comprise a plurality of processors coupled to the plurality of conductive elements. The plurality of processors may be configured to operate either synchronously or asynchronously with each other. The plurality of processors may operate independent of each other.

Alternatively, the touch sensor may comprise a only a single processors coupled to the plurality of conductive elements.

According to a further aspect there is provided a touch screen comprising:

a display screen having a display area; and a touch sensor described herein, in which the sensing region is aligned with the display area.

In one or more examples, the display area comprises an array of picture elements having columns and rows of picture elements. The first set of conductive elements of the touch screen may extend obliquely to a row or column of picture elements.

Also disclosed is a touch sensor comprising:

a sensing region bounded by at least one edge region that extends in an edge region direction; and a plurality of conductive elements that each extend through the sensing region in a direction that is oblique to the edge region direction, wherein the plurality of conductive elements comprises a first set of conductive elements and a second set of conductive elements.

According to a further aspect, there is provided a method of forming a conductor arrangement, comprising:

forming a plurality of conductive elements on a substrate;

dividing the substrate into a plurality of portions in a first direction, each portion defining a set of conductive elements; and re-joining the portions to extend the substrate in a second direction.

In one or more examples, the method comprises modifying the arrangement of the plurality of conductive elements adjacent to a join of the portions of the substrate to merge the respective sets of conductive elements.

In one or more examples, the plurality of conductive elements comprise wires.

In one or more examples, the conductor element arrangement may be a touch sensor.

According to a further aspect, there is provided a method of forming a conductor arrangement, comprising:

forming a plurality of conductive elements on a substrate;

wherein the sensing region is bounded by a first edge region and a second edge region, each conductive element extending through the sensing region in a direction that is oblique to the first edge region direction, wherein the first edge region extends in a first edge region direction, wherein the second edge region opposes the first edge region, wherein the sensing region of the sensing area is bounded by a third edge region that extends between the first edge region and the second edge region, wherein the sensing region is bounded by a fourth edge region that extends between the first edge region and the second edge region and opposes the third edge region, joining the third edge region to the fourth edge region such that the sensing region is provided on a three dimensional substrate.

Joining the third edge region to the fourth edge region may form the substrate into a cylindrical tube.

According to a further aspect, there is provided a touch sensor comprising:

a substrate with a first edge, a second edge, a third edge and a fourth edge, wherein the substrate provides a sensing region, wherein the first edge extends in a first edge region direction, wherein the second edge region opposes the first edge, wherein the third and fourth edges each extend between the first edge and the second edge, a plurality of conductive elements that each extend through the sensing region in a direction that is oblique to the edge region direction, and wherein the third edge is coupled to the fourth edge.

The plurality of conductive elements may comprise a first set of conductive elements and a second set of conductive elements. Each conductive element of the first set of conductive elements may be electrically connected to a corresponding conductive element of the second set of conductive elements at a first edge region to provide respective connected pairs of conductive elements. Each pair of conductive elements may be configured to be coupled to touch sensor circuitry via the at least one edge region.

According to a further aspect, there is provided an element arrangement comprising:

an active region bounded by at least one edge region that extends in an edge region direction; and a plurality of elements that each extend through the active region in a direction that is oblique to the edge region direction, in which the plurality of elements comprises a first set of elements and a second set of elements, in which each element of the first set of elements is electrically connected to a corresponding element of the second set of elements at the at least one edge region to provide respective connected pairs of elements.

The element arrangement may be a conductive element arrangement and the elements are conductive elements, in which each pair of elements is configured to be coupled to circuitry via the at least one edge region. The element arrangement is a display matrix.

According to a further aspect there is provided a conductor arrangement comprising:

an active region bounded by at least one edge region that extends in an edge region direction; and a plurality of conductive elements that each extend through the active region in a direction that is oblique to the edge region direction, in which the plurality of conductive elements comprises a first set of conductive elements and a second set of conductive elements, in which each conductive element of the first set of conductive elements is configured to be electrically connected to a corresponding conductive element of the second set of conductive elements at the at least one edge region to provide respective connected pairs of conductive elements, in which each pair of conductive elements is configured to be coupled to circuitry via the at least one edge region.

In general, the conductor arrangement may comprise any of the features described with reference to a touch sensor embodiment, as well as display embodiments, for example.

Each pair of conductive elements may cross any element of a different pair of conductive elements no more than once. For example, the elements may not cross each other more than once if this would create ambiguity, which may be referred to an undesirable ambiguity. In some situations, ambiguity may not be a problem. For example, with a cylindrical display, perhaps two identical images always need to be shown on either side of the cylindrical display.

Instead of electrical conductors, the electrical part can be omitted, leaving just conductors. These conductors could conduct electricity, water, air, light, sound waves etc. These could be electrically conductive, optical fibres, hydraulic hoses, acoustic/ultrasonic fibres, etc. A typical actuator might be a piezo-electric pad used for haptic sensing.

Also disclosed is a sensor matrix and/or actuator matrix and/or display matrix comprising:

- a sensing and/or actuating and/or display region bounded by at least one edge region that extends in an edge region direction; and
- a plurality of conductive elements that each extend through the sensing/actuating/display region in a direction that is oblique to the edge region direction,
- wherein the plurality of conductive elements comprises a first set of conductive elements and a second set of conductive elements,
- wherein each conductive element of the first set of conductive elements is connected to a corresponding conductive element of the second set of conductive elements at the at least one edge region to provide respective connected pairs of conductive elements,
- wherein each pair of conductive elements is configured to be coupled to sensor/actuator/display circuitry via the at least one edge region.

DESCRIPTION OF THE DRAWINGS

Brief Description of the Figures

Figure 1:
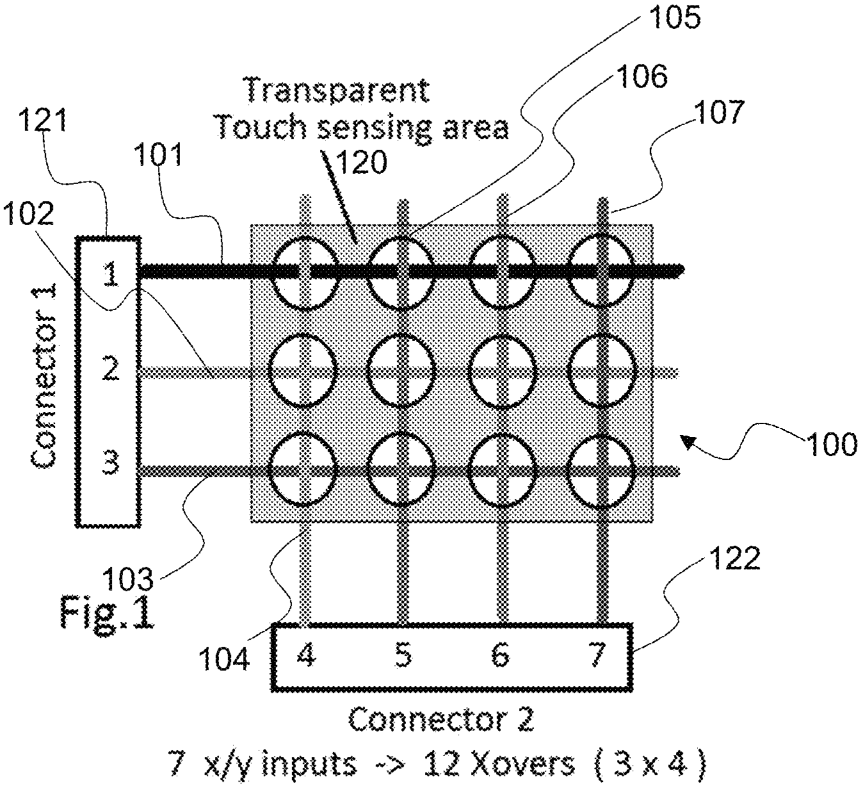
Figure 2:
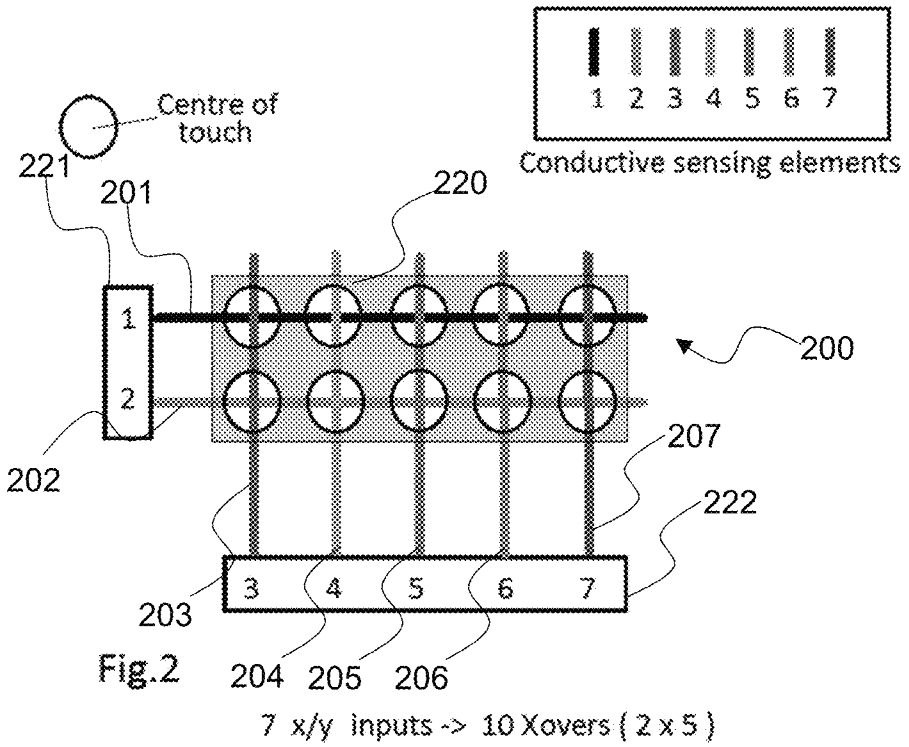
Figure 3:
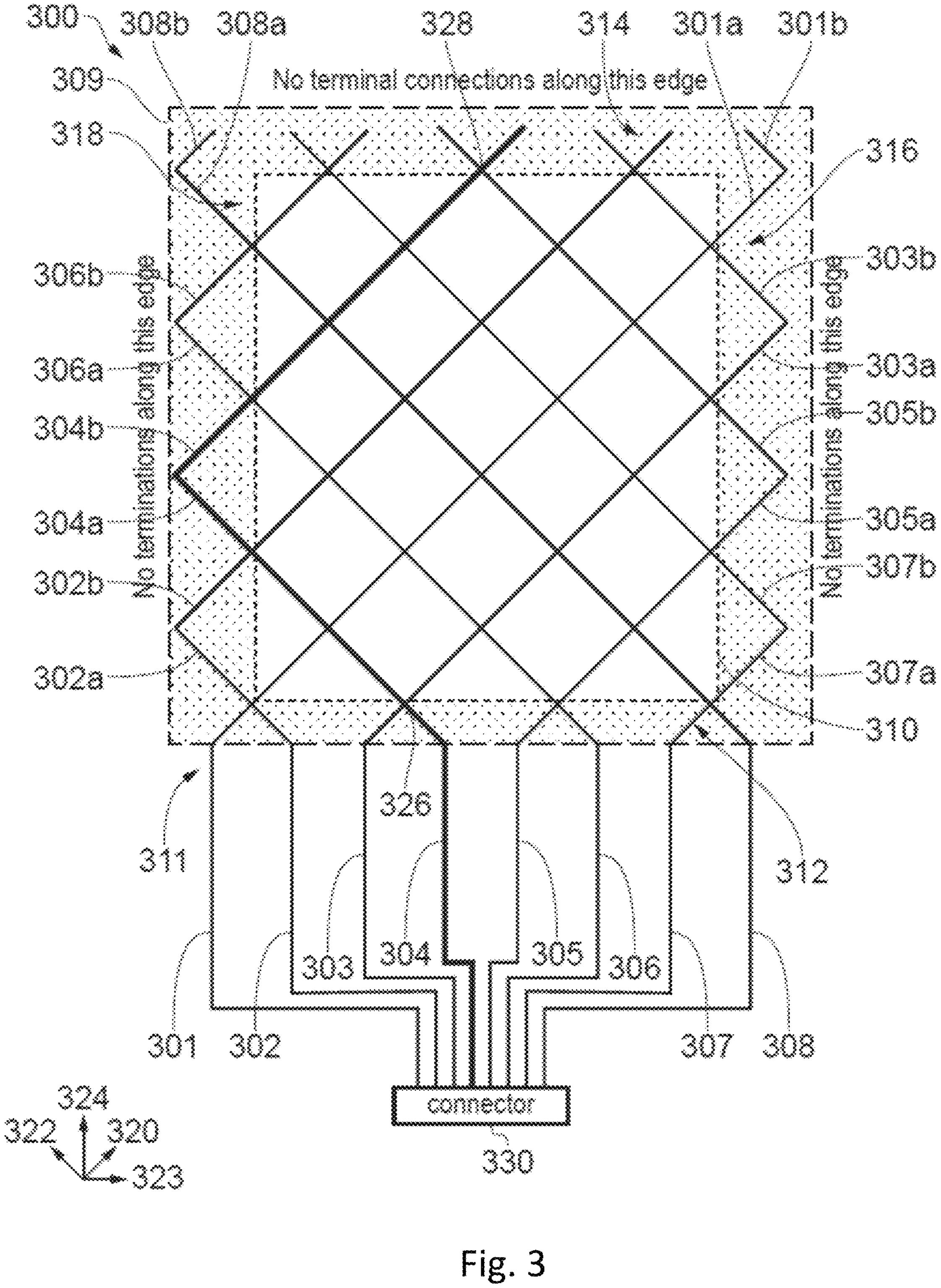
Figure 4:
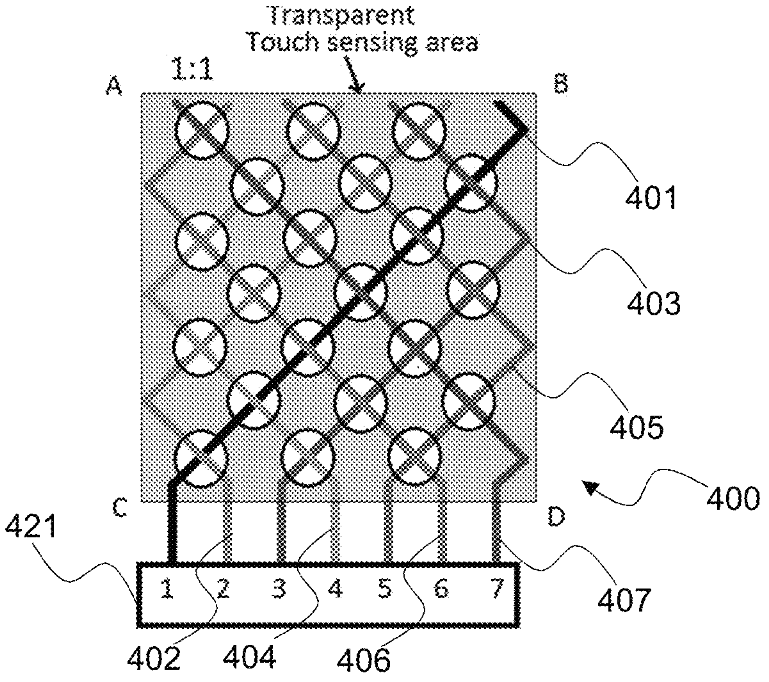
Figure 5:
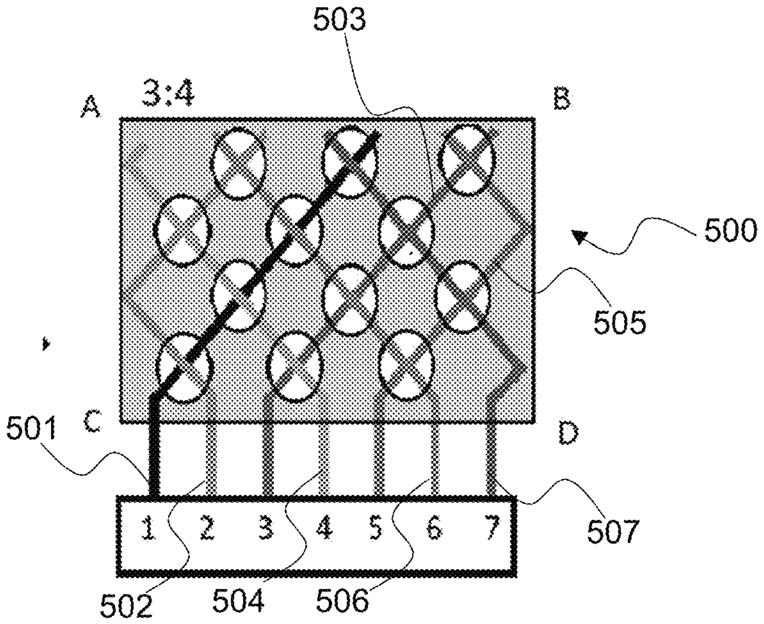
Figure 6:
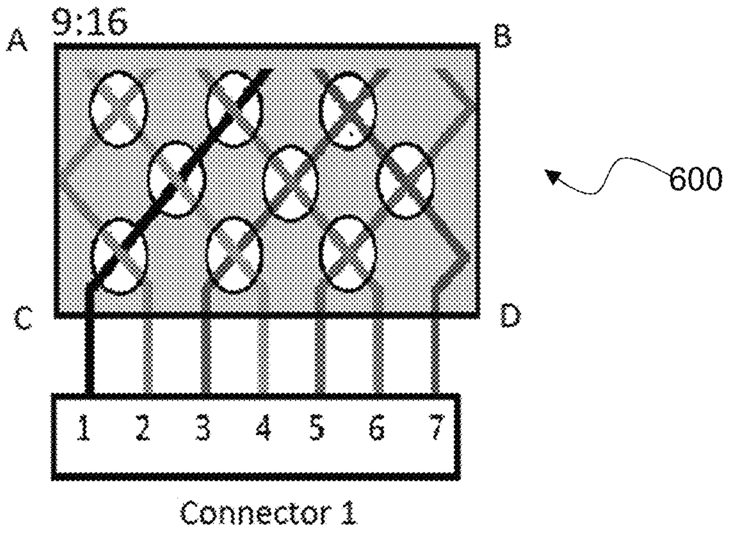
Figure 7:
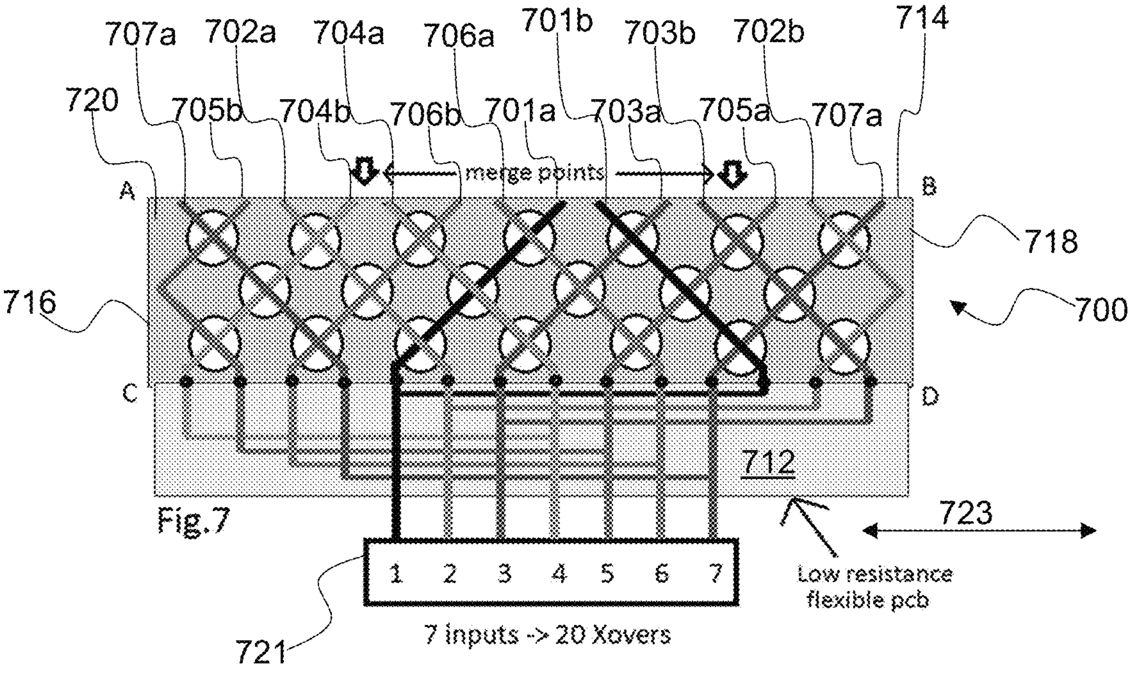
Figure 8:
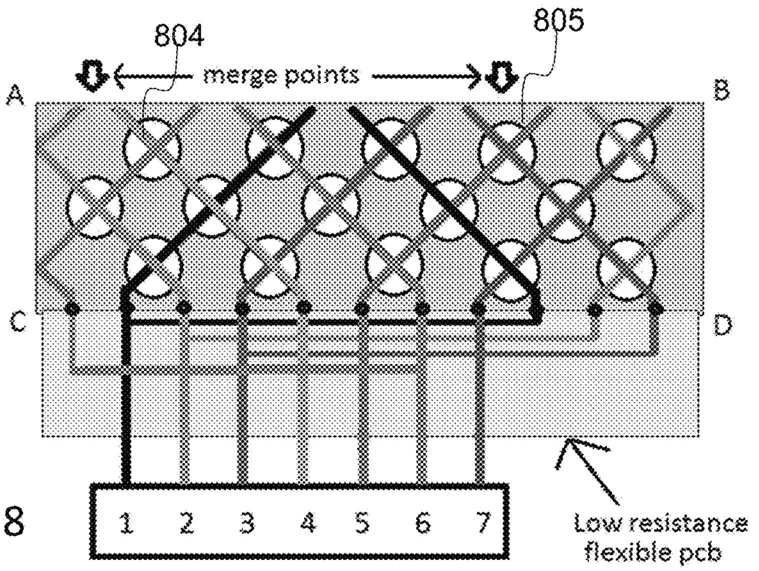
Figure 9:
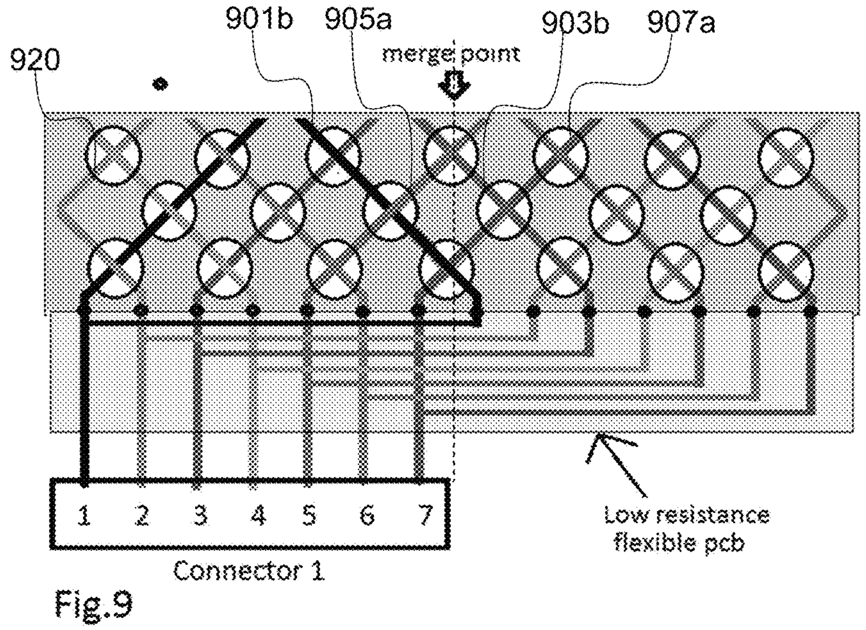
Figure 9A:
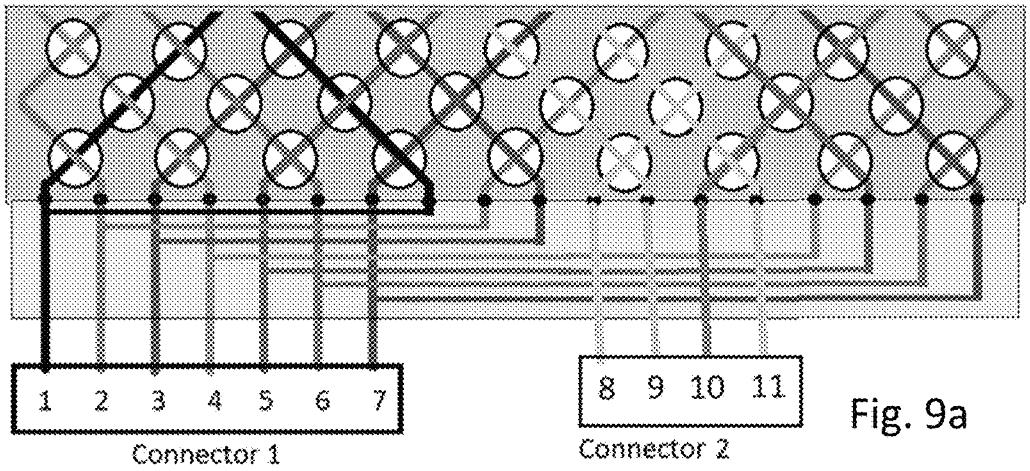
Figure 10:
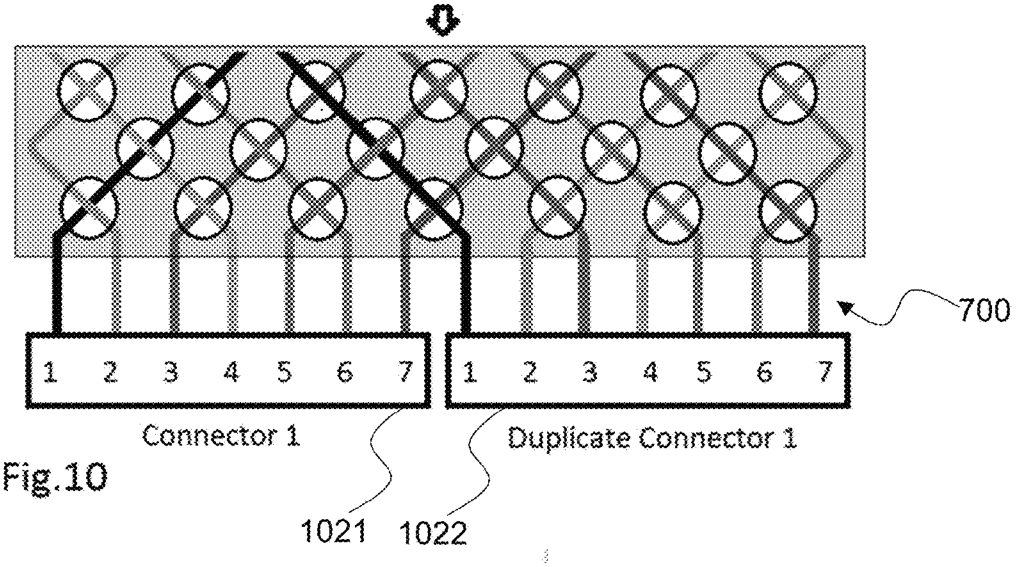
Figure 11:
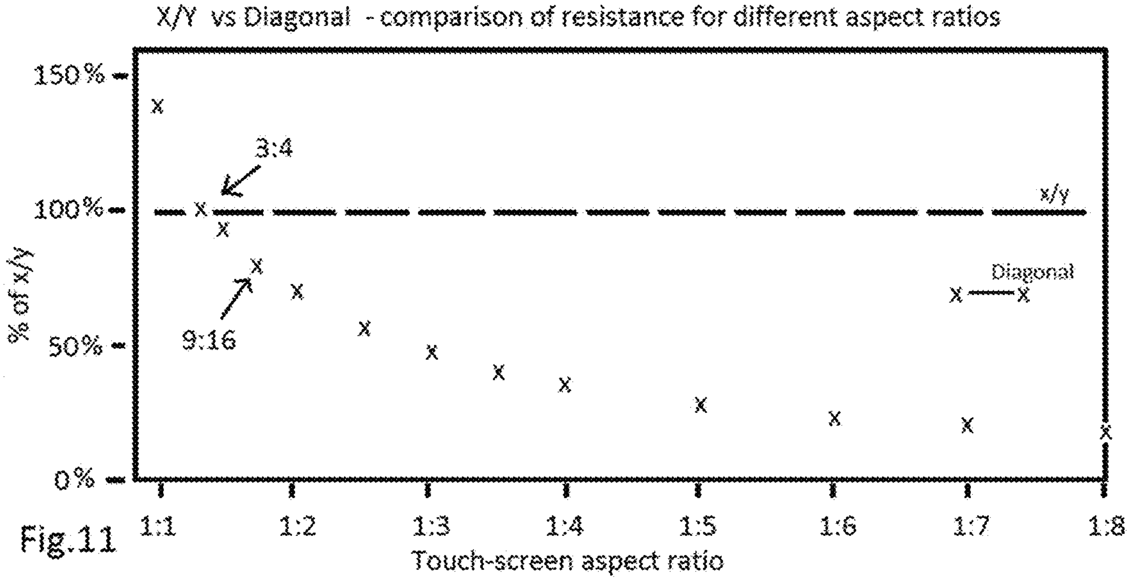
Figure 12:
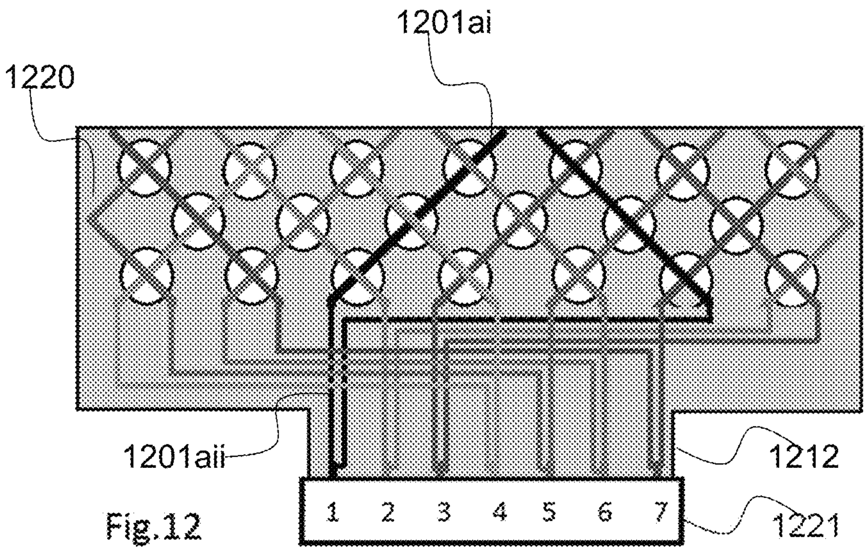
Figure 12A:
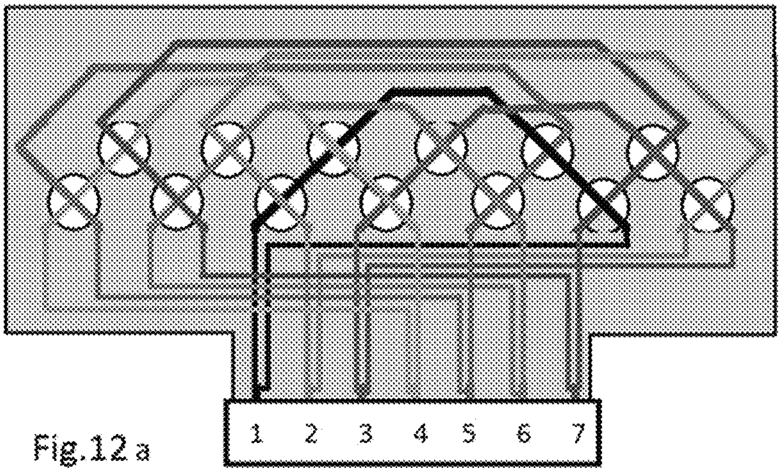
Figure 13:
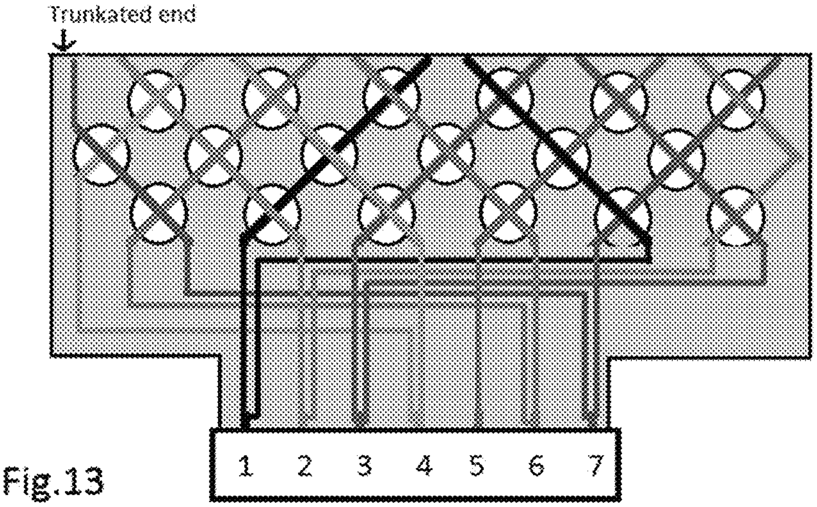
Figure 14:
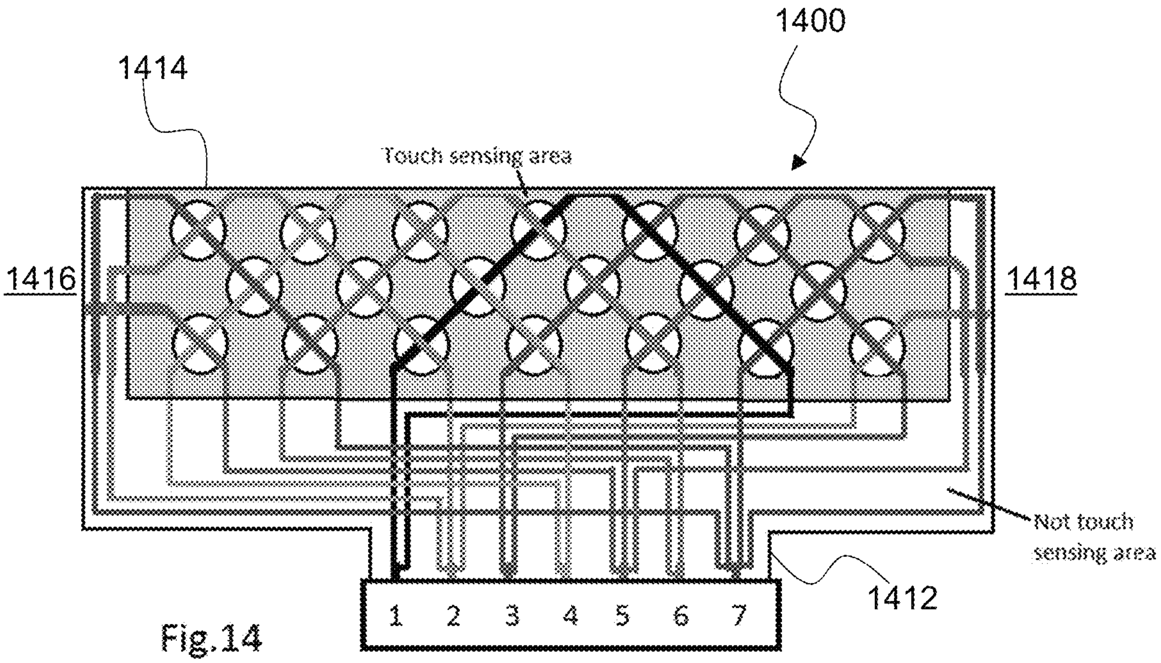
Figure 15A:
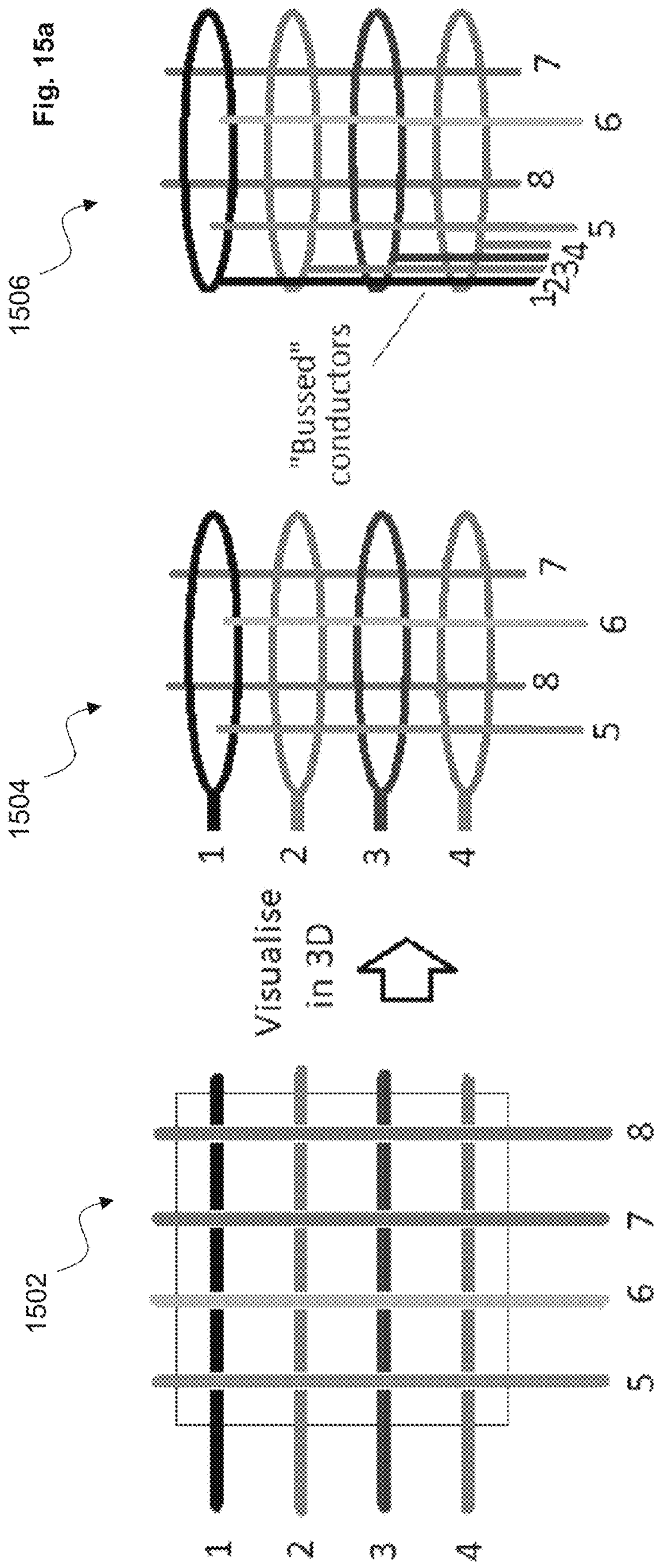
Figure 15B:
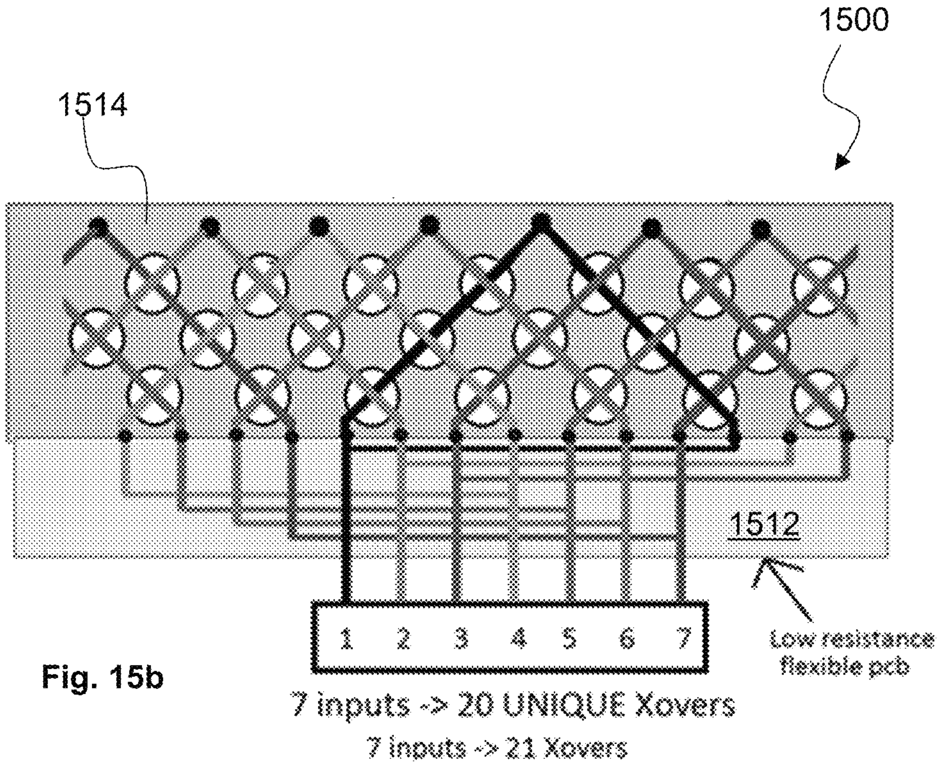
Figure 15C:
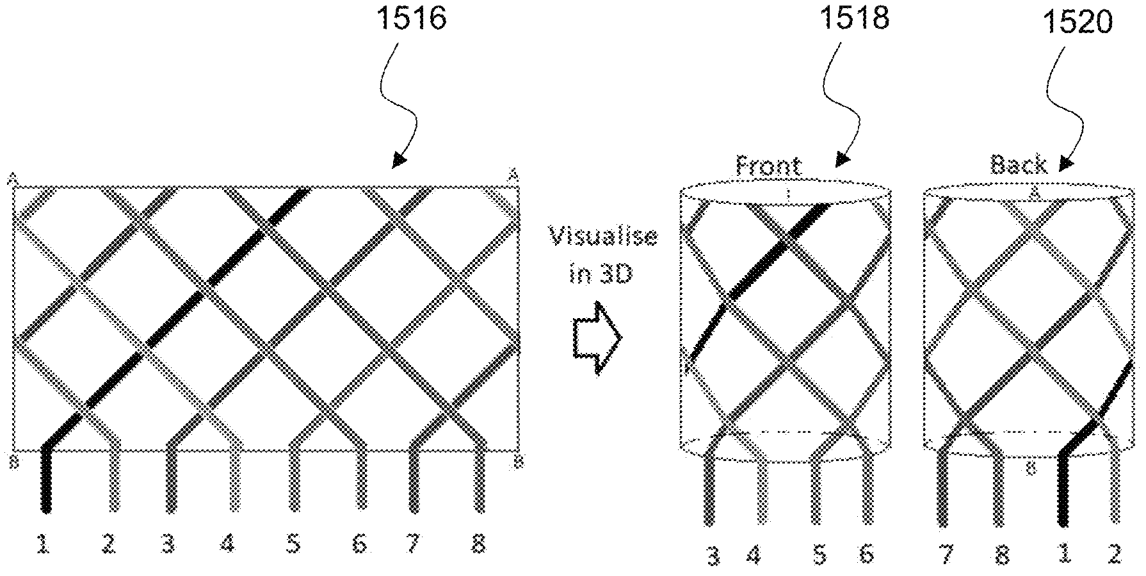
Figure 16:
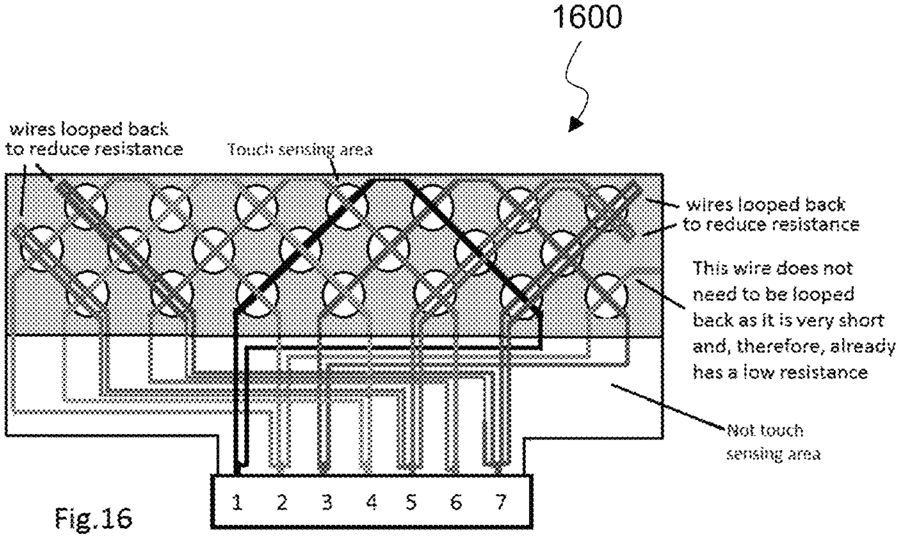
Figure 17:
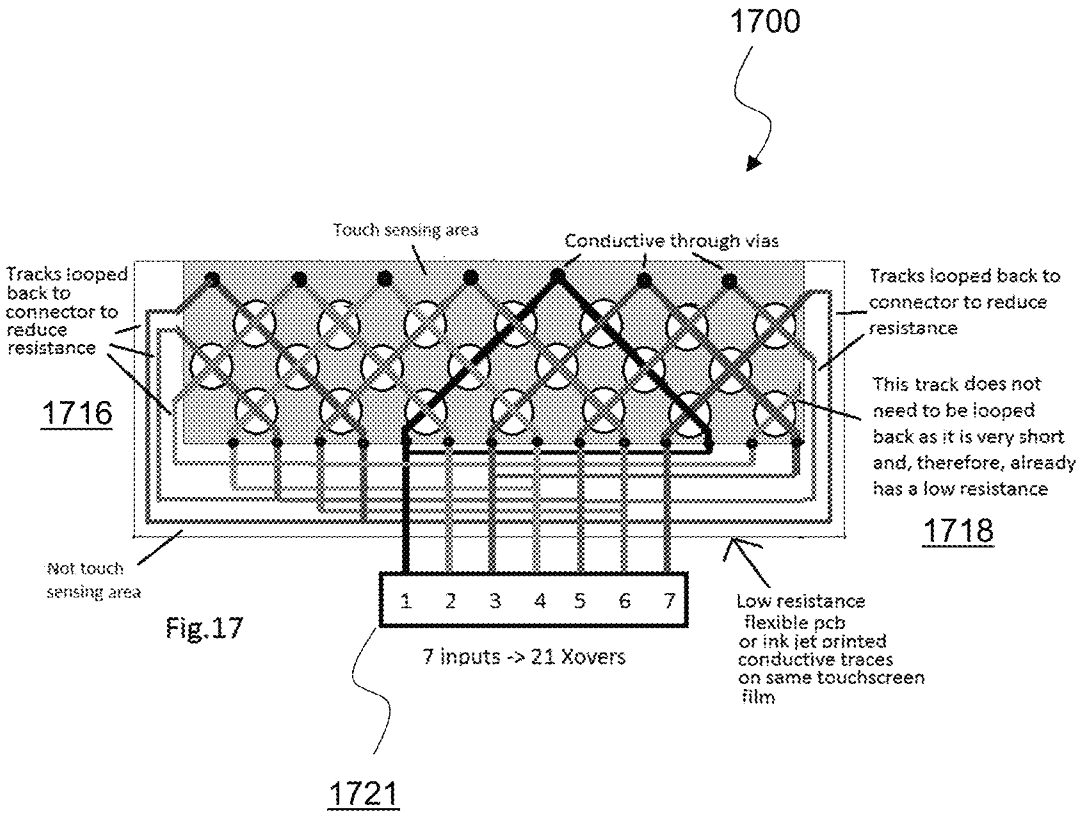
Figure 18:
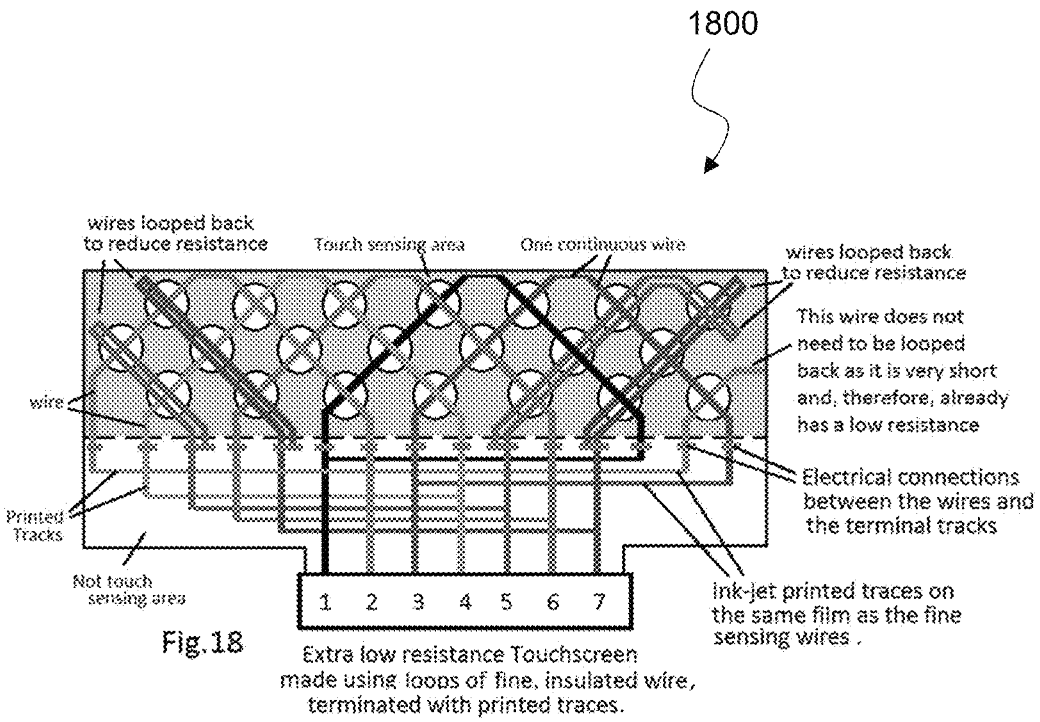
Figure 19:
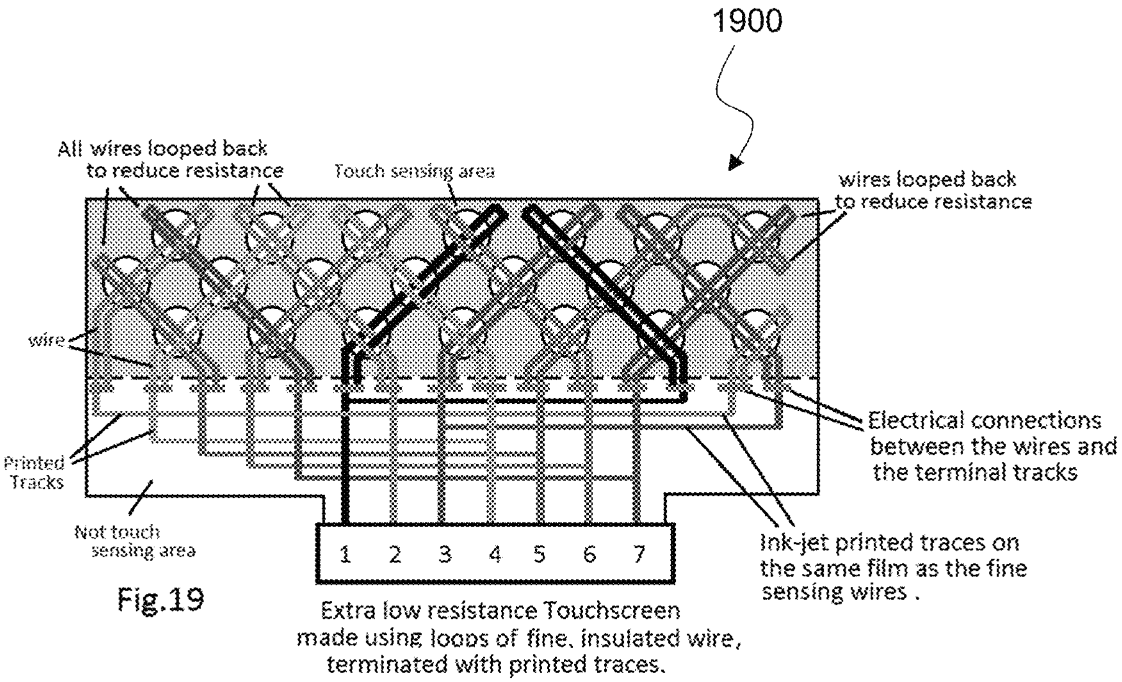
Figure 20:
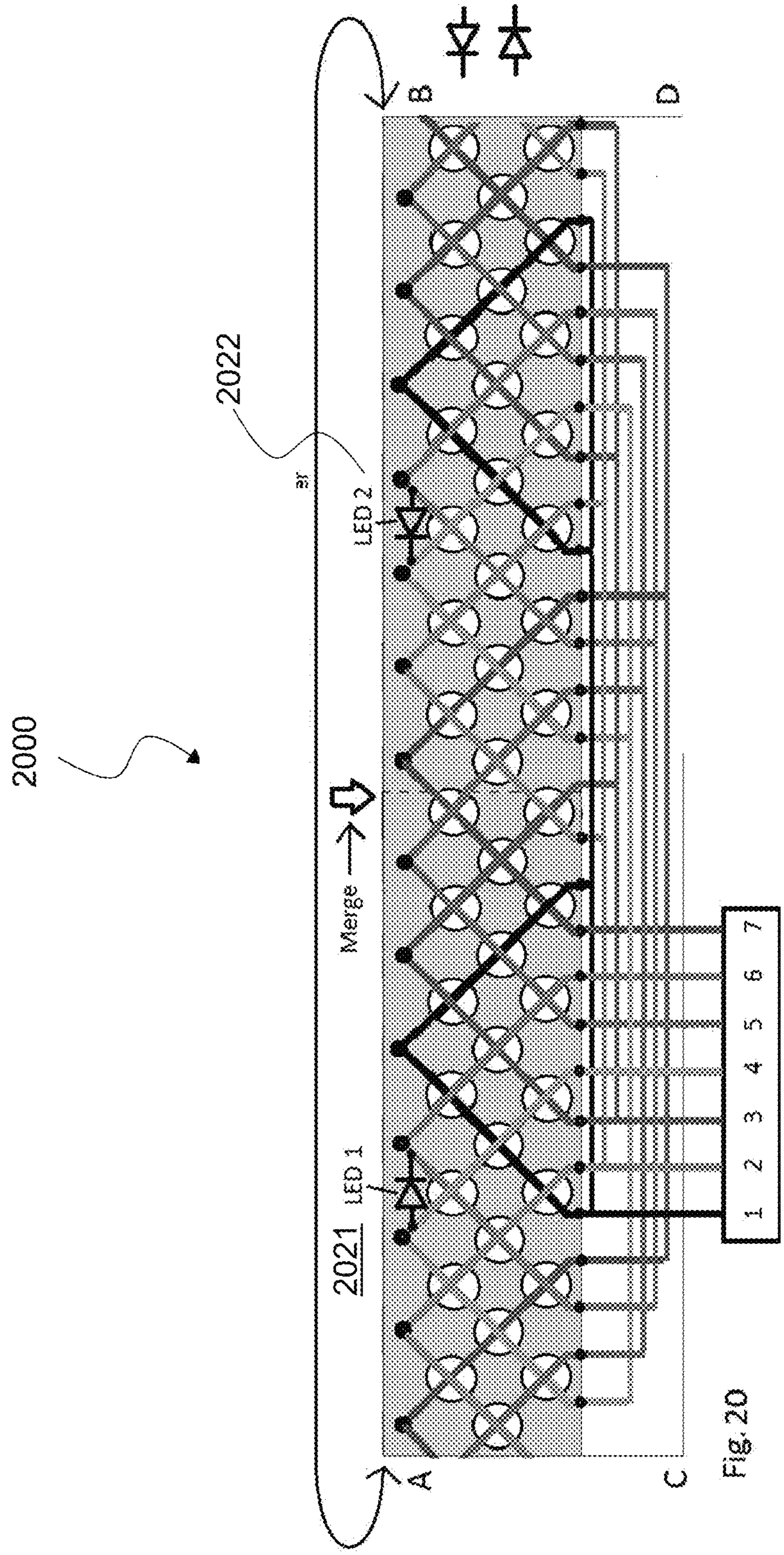
Figure 20A:
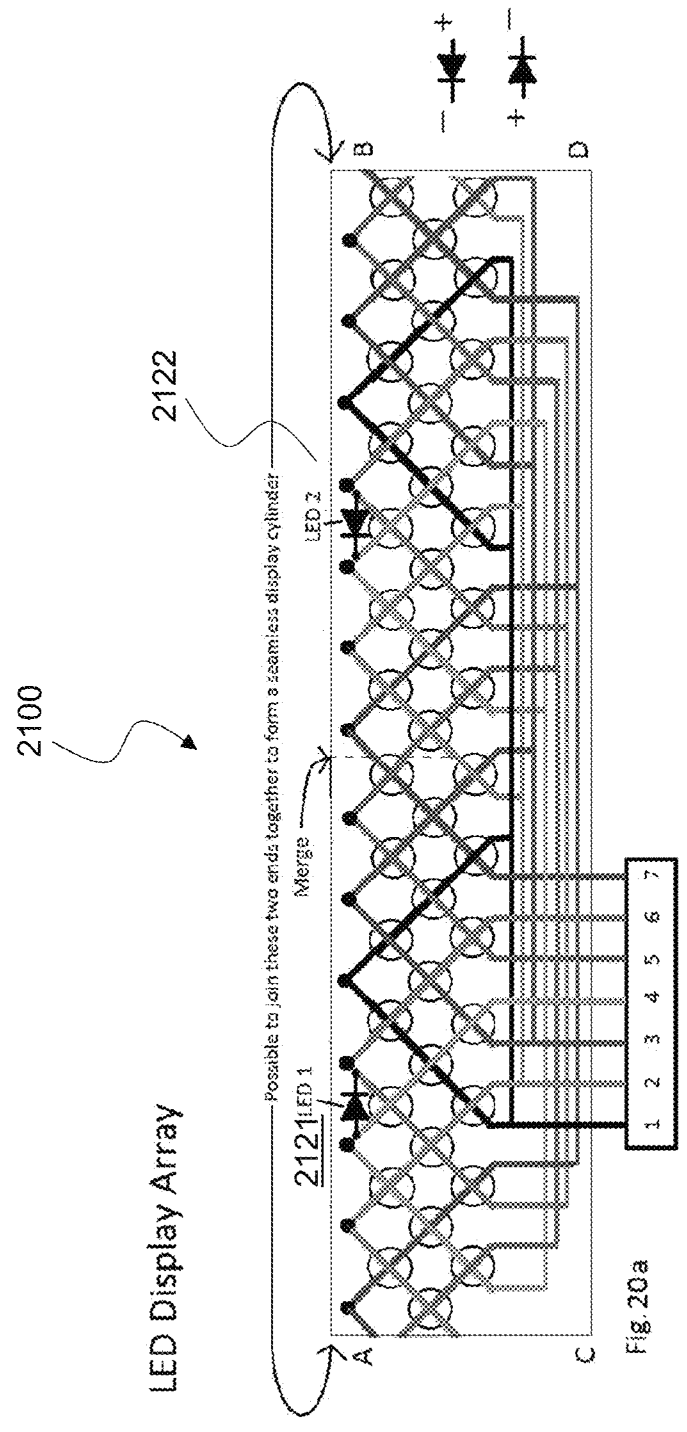
Figure 21B:
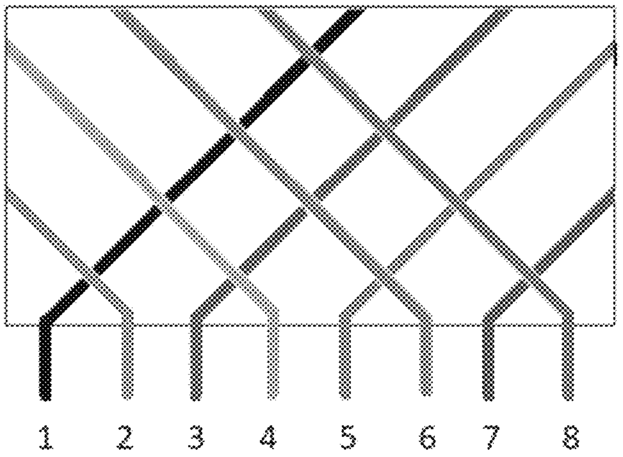
Figure 21C:
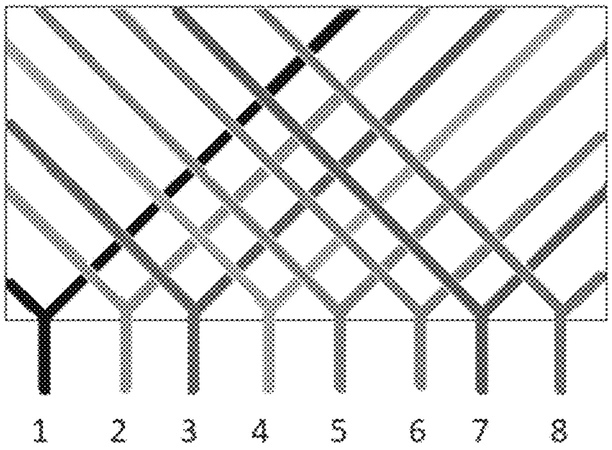
Figure 21D:
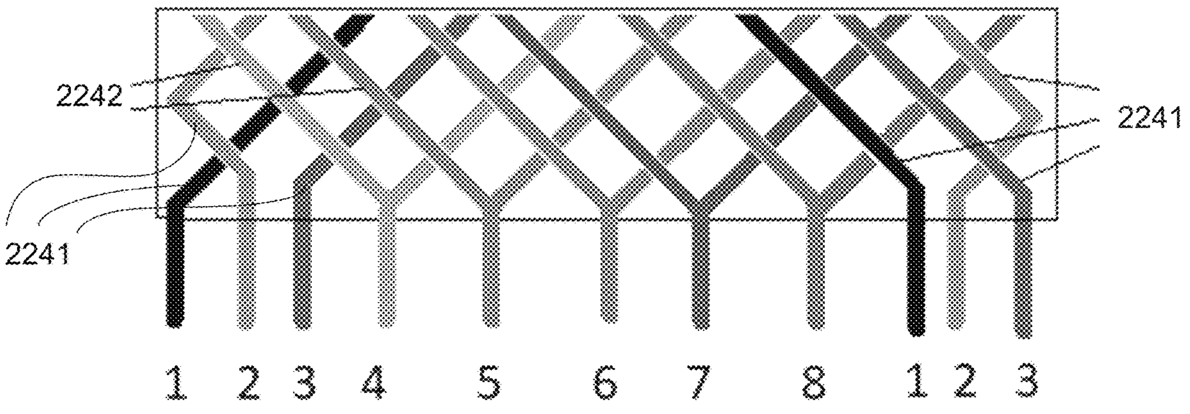
Figure 22A:
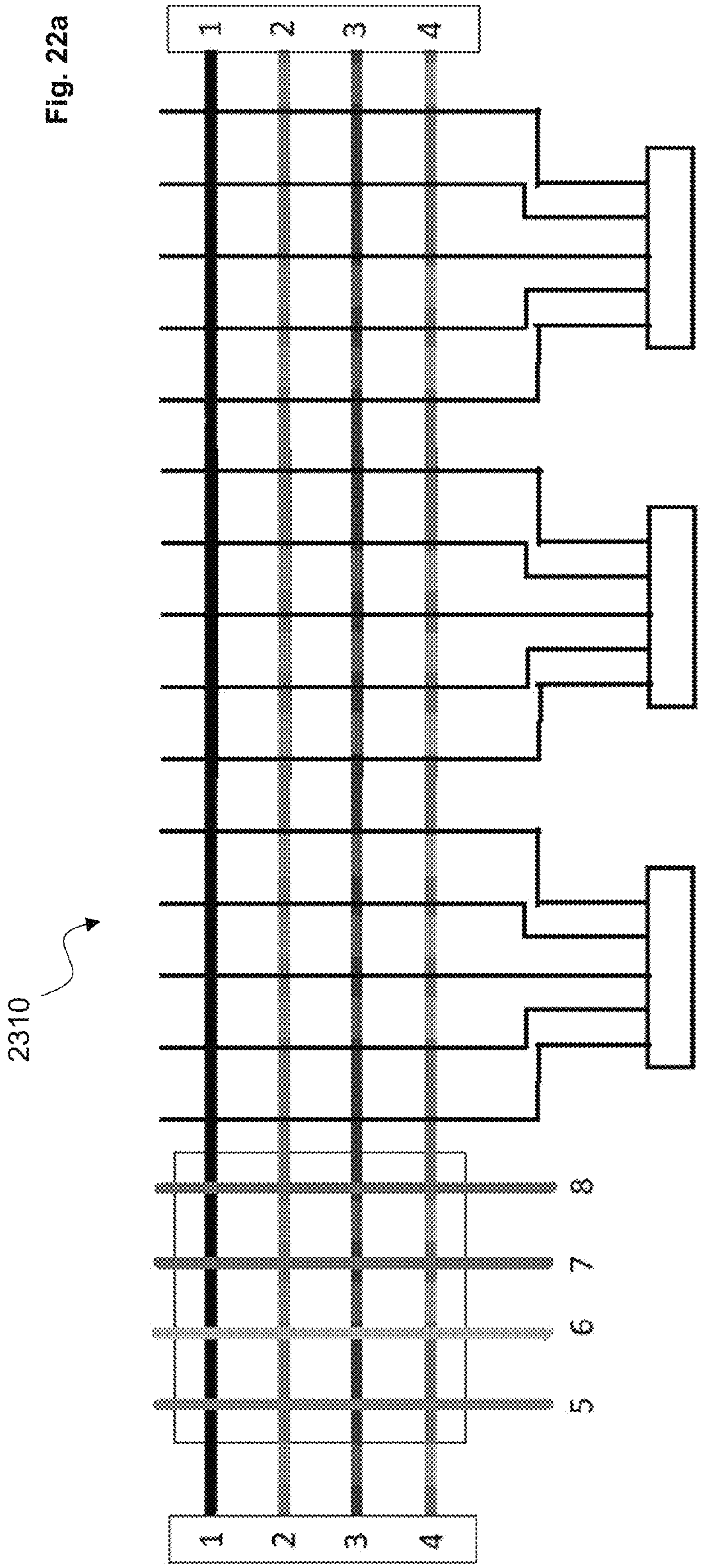
Figure 22B:
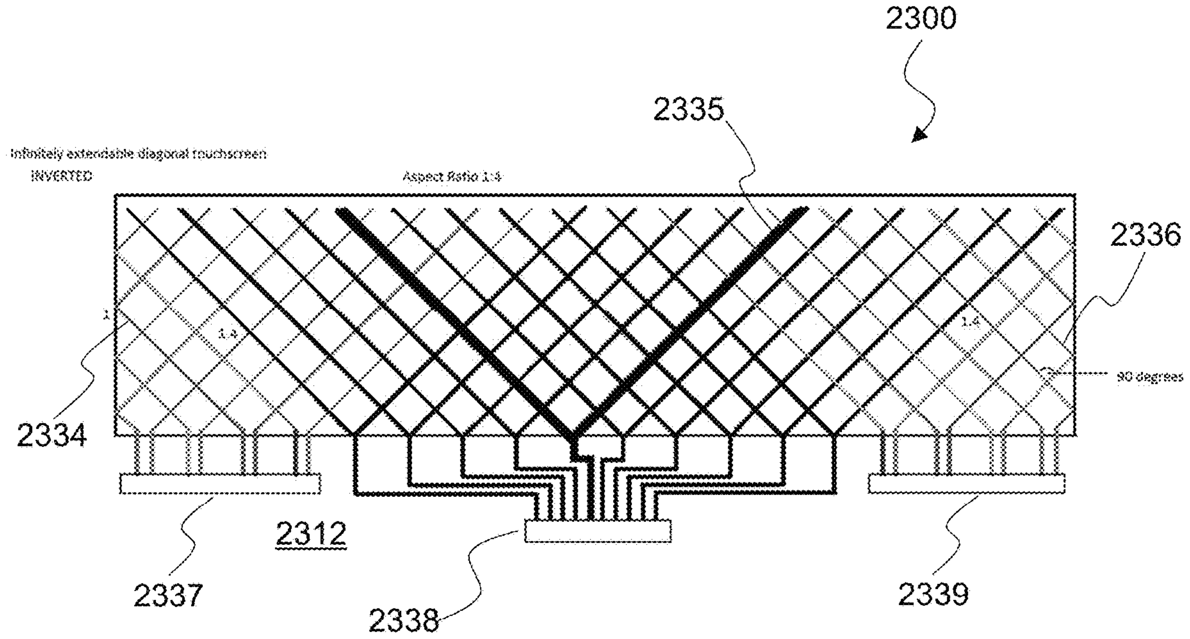
Figure 23:
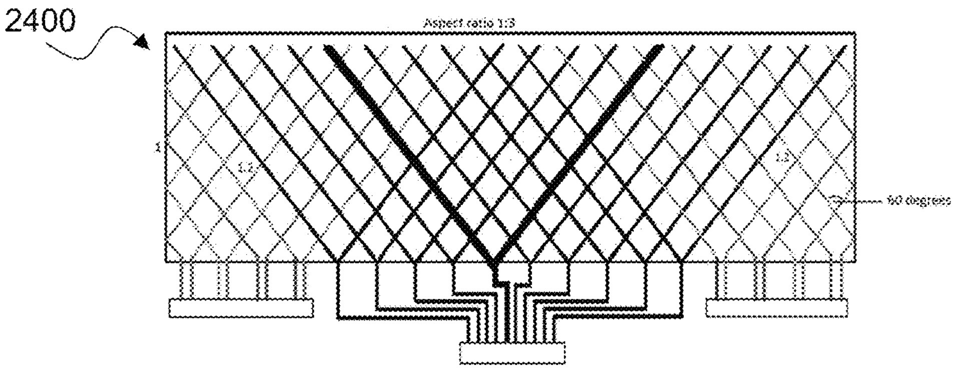
Figure 24:
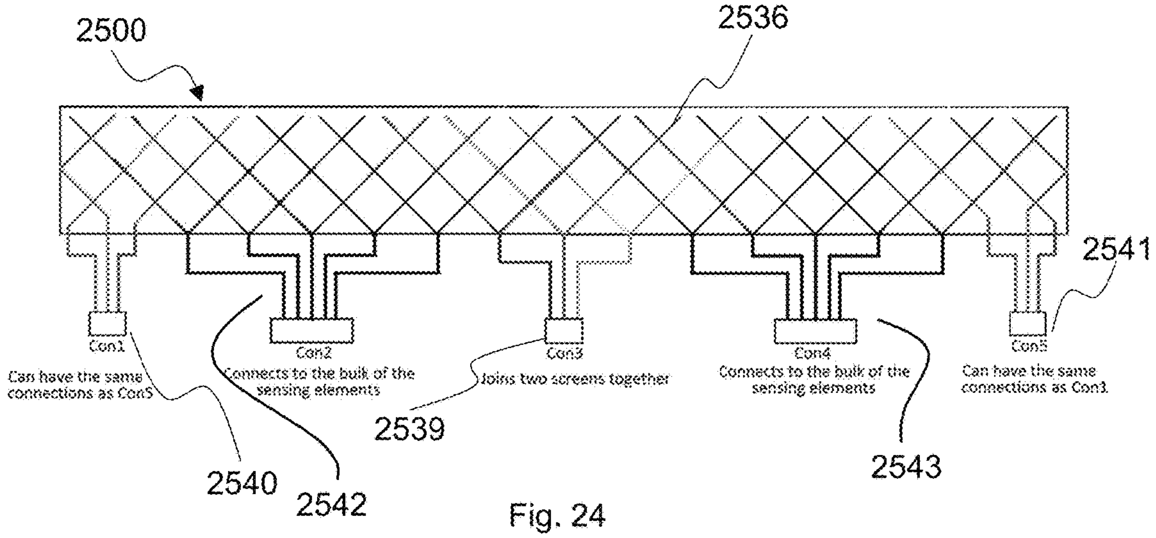
Figure 25B:
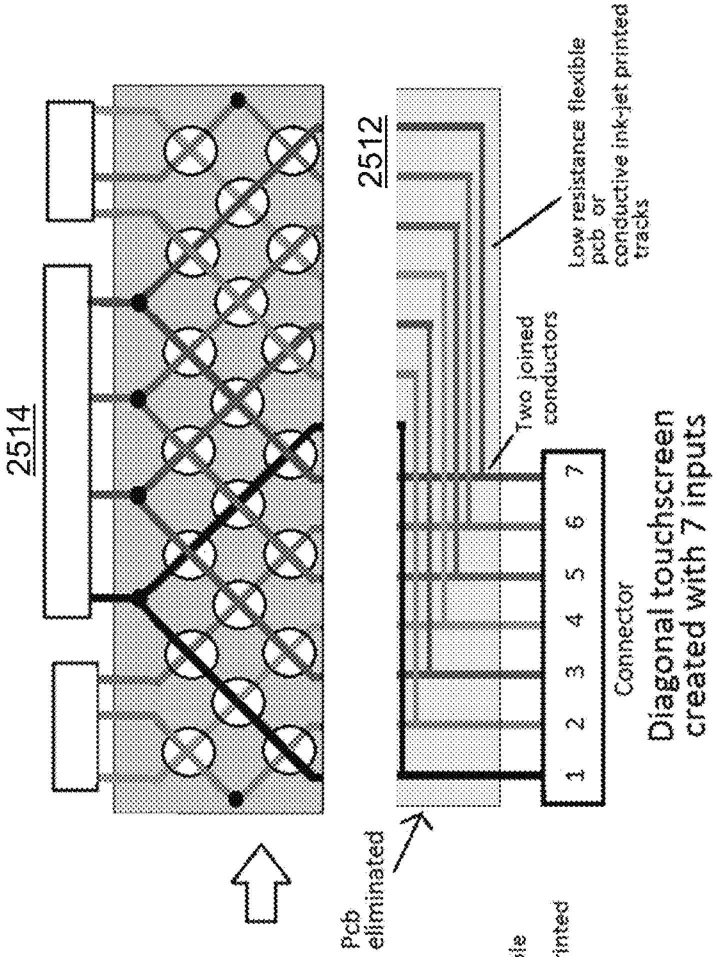
Figure 25A:
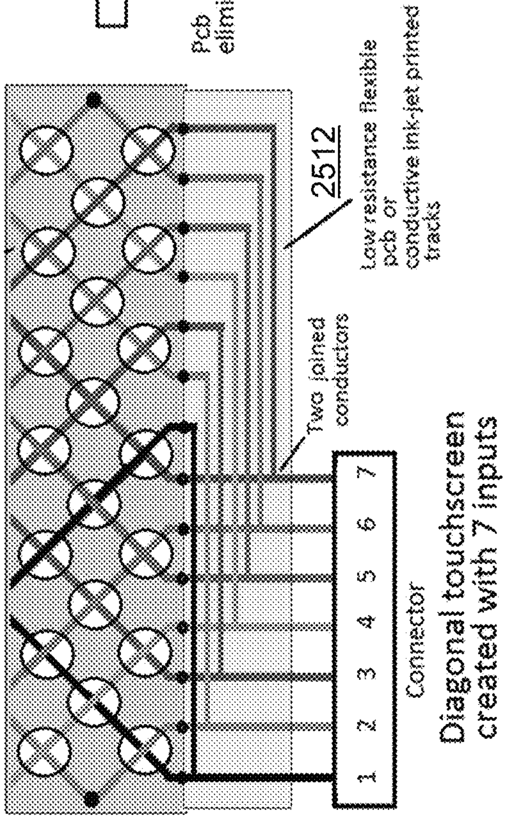

Various aspects of the disclosure are described by way of example and with reference to the accompanying drawings in which:

FIG. 1 illustrates a schematic diagram of a conventional touch pad;

FIG. 2 illustrates a schematic diagram of another conventional touch sensor;

FIG. 3 illustrates a schematic diagram of a touch sensor with a diagonal arrangement of conductive elements;

FIG. 4 illustrates a schematic diagram of another touch sensor with a diagonal arrangement of conductive elements;

FIG. 5 illustrates a schematic diagram of further touch sensor with a diagonal arrangement of conductive elements;

FIG. 6 illustrates a schematic diagram of a reduced touch sensor with a diagonal arrangement of conductive elements;

FIG. 7 illustrates a schematic diagram of a touch sensor providing an extended sensing region comprising a diagonal arrangement of conductive sensing elements;

FIGS. 8 and 9 relate to touch sensors having different merge points to those of the touch sensor of FIG. 7;

FIG. 9*a* illustrates a schematic diagram of a touch sensor that differs from the touch sensor of FIG. 9 in that some of the sensing elements have been rerouted and attached to a second electrical connector;

FIG. 10 illustrates a touch sensor with an alternative connector arrangement;

FIG. 11 illustrates a profile of resistance of a diagonal touch sensor of the type described with reference to FIG. 7 compared to a conventional x/y touch sensor as a function of aspect ratio;

FIG. 12 illustrates a touch sensor in which each conductive element comprises a sensing portion and a connection portion;

FIG. 12*a* illustrates a touch sensor with looped pairs of conductors;

FIG. 13 illustrates a truncated version of the touch sensor illustrated previously with reference to FIG. 12;

FIG. 14 illustrates a schematic diagram of a fine wire touch sensor with diagonally extending conductive sensing elements;

FIG. 15*a* illustrates a schematic diagram of a standard x/y layout of conductive elements similar to those shown in FIGS. 1 and 2 and corresponding visualizations in three dimensions;

FIG. 15*b* illustrates a schematic diagram of another touch sensor providing an extended sensing region comprising a diagonal arrangement of conductive sensing elements;

FIG. 15*c* illustrates an alternative schematic diagram of another touch sensor providing an extended sensing region comprising diagonal arrangement of conductive sensing elements and corresponding visualizations in three dimensions;

FIG. 16 illustrates another touch sensor with looped pairs of conductors;

FIG. 17 illustrates another touch sensor with looped pairs of conductors;

FIGS. 18 and 19 illustrate further touch sensors including looped pairs of sensing elements;

FIG. 20 illustrates a schematic diagram of a wiring layout for use with LEDs or keypads;

FIG. 20*a* illustrates a schematic diagram of another wiring layout for use with LEDs;

FIG. 21A illustrates a schematic diagram of a wiring layout 2200 for use in creating a dual function screen;

FIG. 21B illustrates a schematic diagram of a further touch sensor having a plurality of single conductive tracks;

FIG. 21C illustrates a schematic diagram of a touch sensor having a plurality of split conductive tracks;

FIG. 21D illustrates a schematic diagram of a touch sensor comprising a plurality of single conductive tracks and a plurality of split conductive tracks;

FIG. 22 illustrates a schematic diagram of a further touch sensor with a diagonal array of conductive elements coupled to a plurality of electrical connectors;

FIG. 23 illustrates a schematic diagram of a further touch sensor that corresponds to the touch sensor of FIG. 22;

FIG. 24 illustrates a schematic diagram of a further touch sensor that corresponds to the touch sensor of FIG. 22;

FIGS. 25*a* and 25*b* together illustrate how a conductor arrangement similar to that shown in FIG. 9 can be converted into a conductor arrangement such as that shown in FIG. 22

Figure 26:
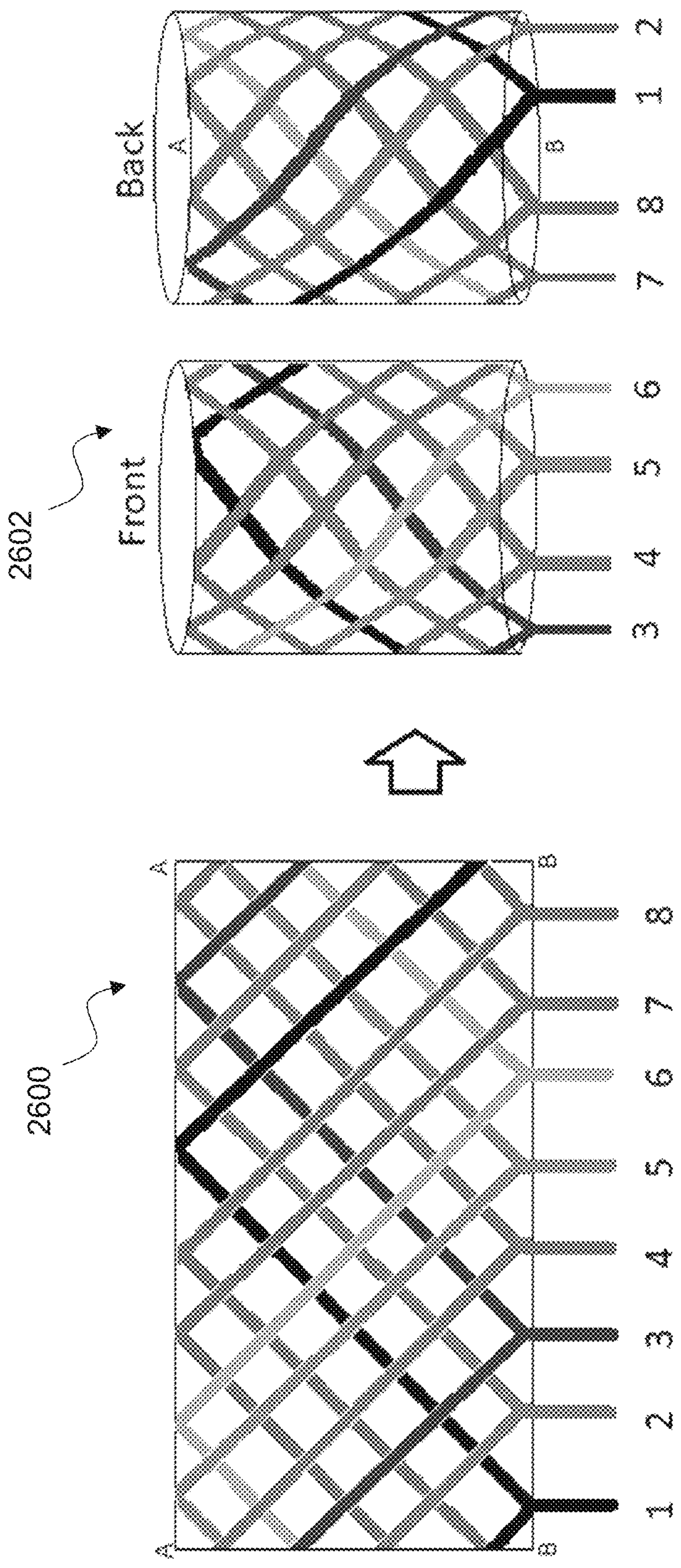
Figure 27:
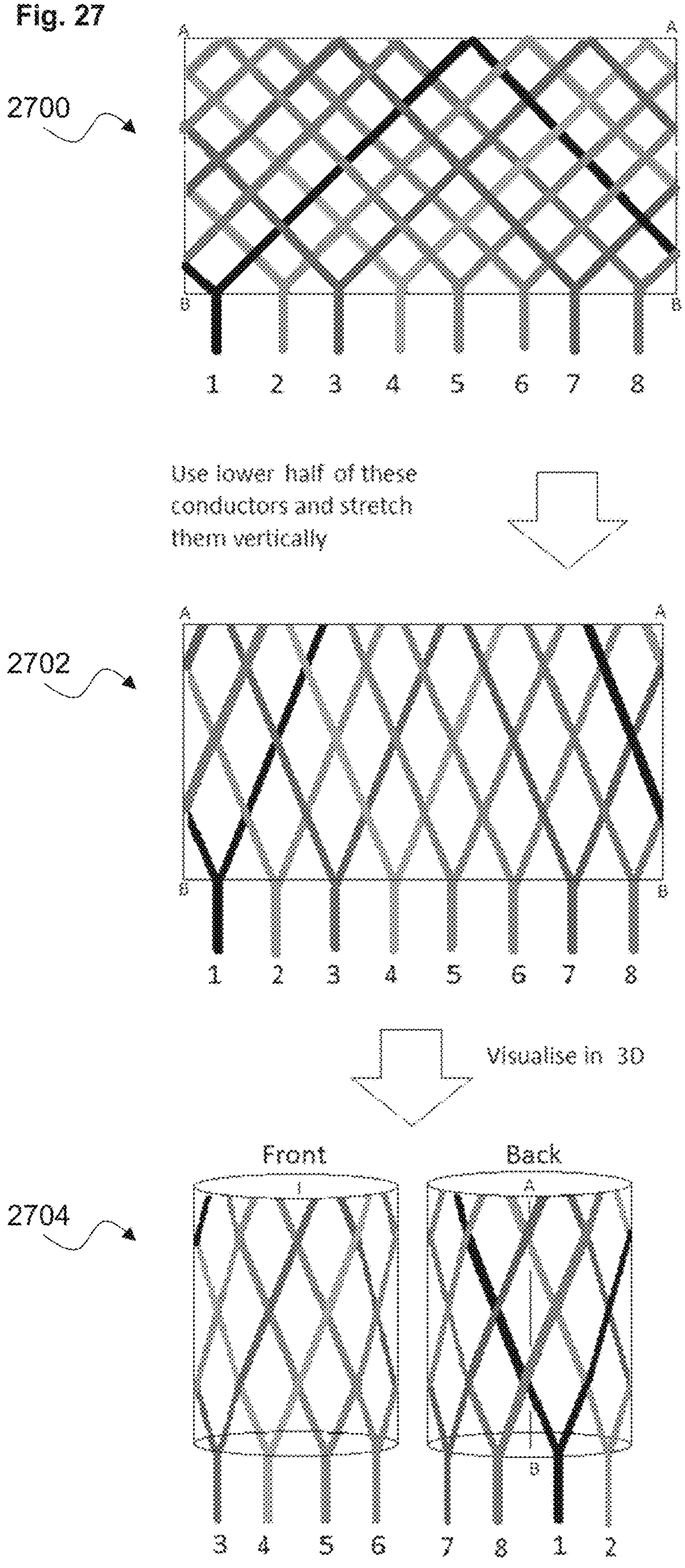
Figure 28A:
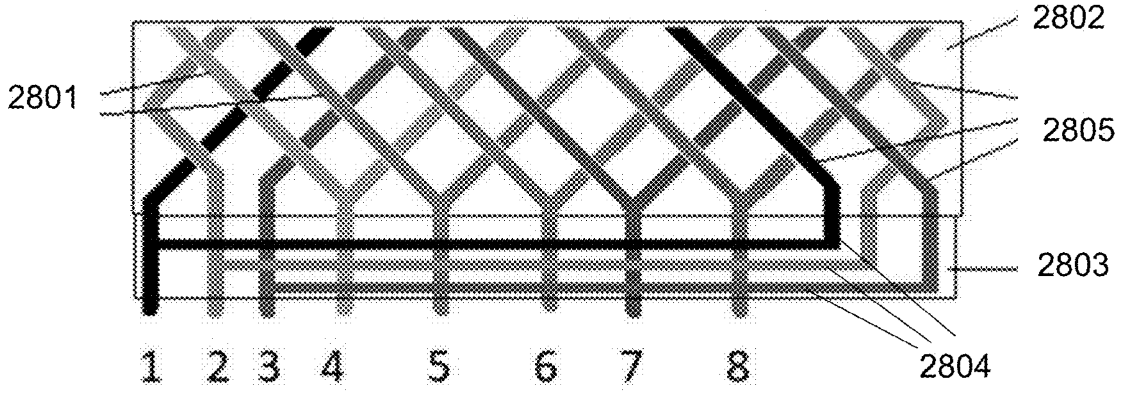
Figure 28B:
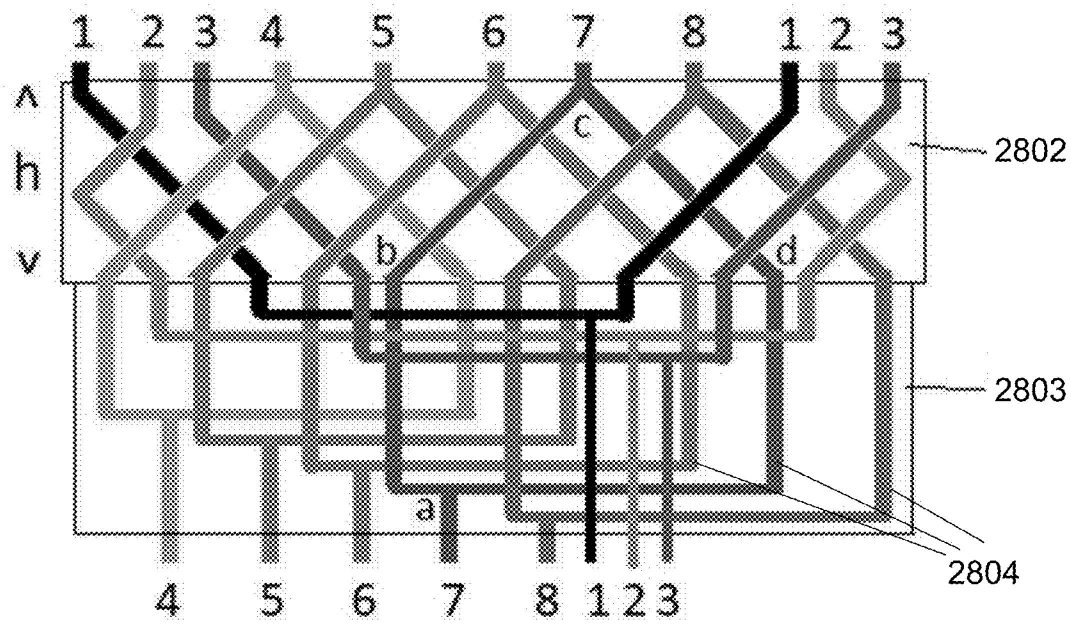

FIG. 26 illustrates how a two-dimensional touch sensor can be formed into a three-dimensional touch sensor;

FIG. 27 illustrates a further example of how a two-dimensional touch sensor can be formed into a three-dimensional touch sensor; and FIGS. 28*a* and 28*b* illustrate further example touch sensors comprising a plurality of conductive tracks where the example of FIG. 28*b* is inverted as compared to the example of FIG. 28*a*.

DETAILED DESCRIPTION

Specific Description

The present disclosure is primarily, though not exclusively directed to touch screen arrangements with reduced sensing element resistance, and associated methods of manufacture. One way to reduce the resistance, without degrading the clarity of the touchscreen, is to reduce the lengths of the sensing element.

As described in WO 2017/013437 A1 (Binstead) has shown that touchscreen elements can be wired diagonally, usually, though not always with each sensing element intersecting crossing every other sensing element at 90 degrees, without any direct electrical contact. The entire content of WO 2017/013437 A1, which also relates to US 2018/0217696 A1, is incorporated herein by reference.

Such structures may be formed using the method and apparatus for forming a wire structure disclosed in GB 2541336 A (Binstead), the entire content of which is also incorporated herein by reference. In such examples, fine, insulation coated wire may be plotted onto an adhesive coated clear polyester film, the resulting plot being encapsulated in a top clear polyester film. Plot a diagonal arrangement may be achieved by providing suitable software instructions. Other methods of manufacture using transparent conductive coatings are also available.

FIG. 3 shows a touch sensor 300 with a diagonal arrangement of conductive elements 301-308 arranged in a sensing area 309. An advantage of the touch sensor 300 compared to the touch sensor of FIG. 2 is that the touch sensor 300 provides 28 intersections, or nodes, using only 8 conductive elements 301-308. The touch sensor 300 therefore has a higher node to conductive element ratio than the touch sensors of FIGS. 1 and 2.

The touch sensor 300 may be a capacitive touch sensor, such as a projected capacitance touch sensor. The touch sensor 300 may comprise circuitry (not shown) connected to the conductive elements 301-308 and configured to determine one or more touch positions in the sensing area based on signals from the conductive elements 301-308. The circuitry may operate using either mutually capacitive or self-capacitive principles, or both alternately, such that the touch sensor 300 is a mutual capacitive touch sensor and/or a self-capacitive touch sensor. For example, in mutual capacitance mode, one conductive element 301 may be a controllable conductive element and the remaining conductive elements, 302, 303, 304, 305, 306, 307, 308, may be a set of sensing conductive elements. Alternatively, in self capacitance mode, all of the conducting elements 301-308 may be sensing elements. The circuitry may also be configured to use the conducting elements 301-308 as shielding elements or masking elements, as is known in the art. The conductive elements 301-308 may be formed using a metallic wire or a conductive track.

The sensing area 309 comprises a first set of conductive elements 301, 303, 305, 307 and a second set of conductive elements 302, 304, 306, 308. Each set of conductive elements comprises a plurality of conductive elements 301-308 in this example but more or less elements may be used. If elements intersect at 90 degrees then the sensing area 309 is rectangular, as in this example.

A central region 310 of the sensing area 309 is bounded by first, second, third and fourth edge regions 312-318. That is, the edge regions extend along the sides of the sensing area 309. The central region 310 of the sensing area 309 may also be referred to as a sensing region because it is the region of the sensing area that is primarily responsible for performing sensing. The edge regions 312-318 have a width, in this example, and are shown as regions with point shading in FIG. 3. Alternatively, an edge region may be considered to be at the very edge and have substantially no thickness. There are no cross-over nodes in this area, and so it cannot be used, as it stands, for mutual capacitance but it may be used for self-capacitance touch detection. (Later it will be shown how this region can be used for mutual capacitance touch detection as well.) The edge regions 312, 314, 316, 318 are provided around the central region 310 and surround the central region 310. The second edge region 314 opposes the first edge region 312. The third and fourth edge regions 316, 318 each extend between the first edge region 312 and the second edge region 314. The fourth edge region 318 opposes the third edge region 316. The first and second edge regions 312, 314 extend in a first edge direction 323 and the third and fourth edge regions 316, 318 extend in a third edge direction 324. The third edge direction 324 is orthogonal to the first edge direction 323 in this example.

In the touch sensor 300 of FIG. 3, there is no distinction between x and y elements, each element can be used to determine x and y coordinates. The elements 301-308 all start at the bottom of the sensing area 309, running diagonally up the sensing area 309 in alternate first and second directions 320, 322. In this example, the first direction 320 is perpendicular to the second direction 322. In this way, all of the elements have connectors 330 to external circuitry along a single edge 311 of the sensing area 309.

The conductive elements 301, 303, 305, 307 of the first set each extend through the central region 310 from the first edge region 312 to the second edge region 314 via the third edge region 316. In this example, the conductive elements 301, 303, 305, 307 of the first set each have a first portion 301*a*, 303*a*, 305*a*, 307*a* that extends in a first direction 320 between the first edge region 312 and the third edge region 316. The first portions 301*a*, 303*a*, 305*a*, 307*a* may extend through the central region 310. The conductive elements 301, 303, 305, 307 of the first set each change direction within the third edge region 316. Before the change in direction, the conductive elements 301, 303, 305, 307 of the first set are getting closer to, or approaching, the third edge region 316 and after the change in direction the conductive elements 301, 303, 305, 307 of the first set are getting further away from the third edge region 316. After the change in direction, the conductive elements 301, 303, 305, 307 of the first set each have a second portion 301*b*, 303*b*, 305*b*, 307*b* that extends in a second direction 322 between the third edge region 316 and the second edge region 314. The second portions 301*b*, 303*b*, 305*b*, 307*b* may extend through the central region 310. The first set of conductive elements 301, 303, 305, 307 passes through the third edge region only once. In this example, the first and second portions of the first and second sets of elements are straight and parallel to other corresponding portions within the same set of elements.

The second set of conductive elements 302, 304, 306, 308 comprises different conductive elements to the first set of conductive elements 301, 303, 305, 307. The second set of conductive elements 302, 304, 306, 308 is interdigitated with the first set of conductive elements 301, 303, 305, 307 at the first edge region 312. In this way, each of the first set of conductive elements 301, 303, 305, 307 has one or two of the second set of conductive elements as its nearest neighbours.

The conductive elements 302, 304, 306, 308 of the second set each extend through the central region 310 from the first edge region 312 to the second edge region 314 via the fourth edge region 318. In this example, the conductive elements 302, 304, 306, 308 of the second set each have a first portion 302*a*, 304*a*, 306*a*, 308*a* that extends in the second direction 322 between the first edge region 312 and the fourth edge region 318. The first portions 302*a*, 304*a*, 306*a*, 308*a* may extend through the central region 310. The conductive elements 302, 304, 306, 308 of the second set each change direction within the fourth edge region 318. Before the change in direction, the conductive elements 302, 304, 306, 308 of the second set are getting closer to, or approaching, the fourth edge region 318 and after the change in direction the conductive elements 302, 304, 306, 308 of the second set are getting further away from the fourth edge region 318. After the change in direction, the conductive elements 302, 304, 306, 308 of the second set each have a second portion 302*b*, 304*b*, 306*b*, 308*b* that extends in the first direction 320 between the fourth edge region 318 and the second edge region 314. The second portions 302*b*, 304*b*, 306*b*, 308*b* may extend through the central region 310. The second set of conductive elements 302, 304, 306, 308 passes through the fourth edge region only once.

Each of the first and second portions 301*a*-308*a*, 301*b*-308*b* of the first and second sets of conductive elements 301-308 is diagonal with respect to the first edge direction 323 in which the first or second edge regions 312, 314 extend, and diagonal with respect to a third edge direction 324 in which the third and fourth edge regions 316, 318 extend. In this example, the first portions 301*a*, 303*a*, 305*a*, 307*a* of the first set of conductive elements 301, 303, 305, 307 extend transverse or obliquely to the first portions of the second set of conductive elements 302, 304, 306, 308. Similarly, the second portions 301*b*, 303*b*, 305*b*, 307*b* of the first set of conductive elements 301, 303, 305, 307 extend transverse or obliquely to the second portions 302*b*, 304*b*, 306*b*, 308*b* of the second set of conductive elements 302, 304, 306, 308. The arrangement of the first and second sets of conductive elements 301-308 results in the formation of a matrix of cross over points, which may also be referred to as intersections or nodes of the touch sensor 300. The respective conducting elements 301-308 remain separate, or isolated, from each other at the various nodes. The arrangement of the first and second sets of conductive elements 301-308 is such each conductive element crosses over each of the other conductive elements only once.

The sensing area may be considered to be defined by the bounds of the conductive elements 301-308 of the touch sensor 300. The central portion 310 of the sensing area may be considered to be defined by the bounds of the nodes of the touch sensor 300. That is, the matrix of cross over points may define the central region 310 of the sensing area and the edge regions 312, 314, 316, 318 of the sensing area may form a periphery around the bounds of the matrix of cross over points.

One conductive element, in this example a fourth conductive element 304, is emphasized for clarity, but essentially follows the same rules as, and has a similar layout to, all the other elements. The fourth conductive element 304 runs up the touch sensor 300 diagonally to the left, first crossing its nearest neighbour to the left, a third conductive element 303 at a third-fourth node 326. When the fourth conductive element 304 gets to the left side of the sensing area 309 at the fourth edge region 318, it turns right, and traces a route diagonally up the sensing area 309, eventually crossing its original nearest neighbour to its right, a fifth conductive element 305 at a fourth-fifth node 328, before finishing at the top of the sensing area 309 at the second edge region 314. Throughout this route, the fourth conductive element 304 crosses all of the other elements 301-303, 305-308 just once. The other elements 301-303, 305-308 follow similar routes to the fourth conductive element 304.

With an even number of elements, half of the elements 301-308 start off extending to the right and the other half start off extending to the left. This layout advantageously results in all the elements 301-308 being very similar to each other, in terms of their layout and length, resulting in similar sensitivity to touch.

The presence of a finger adjacent to a node of the touch sensor 300 may be detected by comparing signals from the various conductive elements 301-308. The touch sensor 300 may itself comprise, or be attached to, circuitry that is connected to the conductive elements 301-308 and configured to determine one or more touch positions in the sensing area 309. Such circuitry, which may implement a mutual capacitance or self-capacitance sensing technique, is discussed further in US2018/0217696, incorporated by reference.

The conductive elements 301-308 of the touch sensor 300 each have two ends: a first end at the first edge region 312 and a second end at the second edge region 314. The conductive elements 301-308 are each configured to be connected to the circuitry at only the first end in this example. The second end of the conductive elements 301-308 does not require termination in this example. Because all the elements 301-308 are connected to a terminal at one end only with no terminal connections on the other three sides, very little "non-sensing" zone 311 is created around the second, third and fourth edge regions 314, 316, 318. This means that a bezel may not be required to hide "feed" wires along the edges of the touch-screen.

The non-sensing zone 311 is the region around the sensing area that comprises "feed" tracks from a connector to the start of the conductive elements within the sensing area. In this case, the touch sensor 300 does not have a non-sensing zone along three of its sides, but does have a non-sensing zone 311 where tracks are led to the connector at the bottom.

If an edge region has a sensing element in it, such as a returning "bent" sensing element, and is being used with self-capacitance, then this is a zone that is capable of detecting a finger, even though this may be outside the display zone. However, if a region has no intersecting elements in it, and is being used solely with "mutual capacitance, then this is, in effect, a non-sensing zone, which may also be considered to be an edge region of the sensing area. In FIG. 3, the non-sensing zone 311 has "feed" tracks in it that are capable of sensing, but are in positions where they would not normally be touched.

FIG. 4 illustrates a schematic diagram of another touch sensor 400 with a diagonal arrangement of conductive elements 401-407 coupled to an electrical connector 421. Other than the touch sensor 400 of FIG. 4 comprising seven sensing elements instead of eight as described previously with reference to FIG. 3, the touch sensor 400 is generally similar to that described previously with reference to FIG. 3. The seven touch sensing elements 401-407 of FIG. 4 provides 21 crossover points, or sensing nodes, with a square 1:1 aspect ratio.

In this example, there are seven conductive sensing elements to allow comparison with the conventional arrangements described previously with reference to FIGS. 1 and 2.

All the conductive sensing elements 401-407 have the same length of 1.414 times the minimum dimension of the touchscreen. This diagonal layout nearly doubles the number of intersections possible for a fixed number of sensing elements but, creates a 1:1 aspect ratio touchscreen that increases the length, and therefore the resistance of the conducting elements from 1 unit of length, for a square x/y touchscreen, to 1.414 units of length for a square diagonally wired touchscreen, increasing the resistance by 41.4%.

FIG. 5 illustrates a schematic diagram of a further touch sensor 500 with seven touch sensing elements as described previously with reference to FIG. 4. In this example, the sensing region has been reduced divided by making a horizontal cut, in the example of FIG. 4, such that the seven sensing elements herein provide 12 sensing nodes with a 3:4 aspect ratio. As such, the top half of this touchscreen has been removed, leaving behind a touch sensor with a similar number of intersections and aspect ratio to its x/y equivalent described previously with reference to FIG. 1. However, the diagonal version illustrated in FIG. 5 still has a 6% longer track length than the x/y equivalent version.

FIG. 6 illustrates a schematic diagram of a further touch sensor 600 with seven touch sensing elements as described previously with reference to FIG. 4. In this example, the sensing region has been reduced divided by making a horizontal cut, in the example of FIG. 4, such that the seven sensing elements provide nine sensing nodes with a 9:16 aspect ratio. Even though this shows a reduction of 21% in track length, there is no overall "beneficial effect" due to an associated 25% loss of touch sensing points. There being only 9 sensing nodes in the diagonal version, compared with 12 sensing nodes in its x/y equivalent.

Any of the examples of touch sensors with diagonally extending sensing elements, the sensing region of the touch sensor may be aligned with edges of a display area. In particular, an orientation of the central sensing region may be aligned with respect to edges of the display area. The conductive elements are therefore arranged obliquely to the edges of the display area in such examples.

The display area typically comprises an array of picture elements (pixels) arranged in columns and rows. The first and second sets of conductive elements of the touch screen extend obliquely to the rows and columns of pixels. The conductive elements of the touch sensor also extend diagonally to edges of the display area.

With the elements disposed at 45 degrees to the edges of the display area, the sensing area would normally be square.

With a rectangular display, the touch sensor of FIG. 4 would have to be cut down, from a square to a matching rectangle, resulting in a touch sensor such as illustrated by FIG. 6. The number of elements required is determined by the length of the longer side of the display.

The sensing area of FIG. 4 may not physically be cut vertically, else many conductive elements would be left unterminated at the connector. However, the sensing area can physically be cut horizontally, resulting in an evenly spaced sensing pattern throughout the sensing/display area that remains. This means that a small range of standard widths of touch-screen film can be manufactured, which, when cut down in length can fit a wide range of display sizes. Alternatively, a custom made touch-screen can be manufactured with the top part missing. That is, a top part of the touch sensor may be either cut off or not manufactured at all. By cutting down the film before each of the conductive elements has a chance to cross every other conductive element, some conductive elements will not reach as far as the third or fourth edges and so, will not have a change in direction within the sensing area.

It has been found that the unused nodes that were in the material that is cut off can be usefully re-positioned to alter the aspect ratio of the sensing area. For example, the top half of the diagonal touchscreen can be "moved" to the side of the bottom half of the touchscreen, and, by re-arranging the routes of some of the edge elements, it can merge "seamlessly" with the bottom half. This changes the aspect ratio from 1:1 to 1:4 (0.5:(1+1)) potentially, without losing any of the sensing nodes. Conductive elements from the "moved" top half can be electrically "re-joined" to the appropriate conductive elements of the "unmoved" bottom half by low resistance conductive tracks, in the "non touch" zone, at the bottom of the touchscreen. This arrangement significantly reduces the length, and therefore the resistance of the conductive elements in the touch sensing area. Instead of the conductors, in a diagonally wired 1:1 aspect ratio touchscreen being 41% longer than the conductors in an equivalent x/y touchscreen, when converted to 1:4 aspect ratio, by the above transformation, the diagonal conductors become 82% shorter than the longest x/y conductor (0.7 vs 4).

The disclosure therefore provides a method of forming a conductor arrangement, comprising the equivalent of:

- forming a plurality of conductive elements on a substrate, such as that described previously with reference to FIG. 4;
- dividing the substrate into a plurality of portions by transposing the portion that would have been at the top half of the sensing region to the side of the bottom half of the sensing region; and
- re-joining the two portions seamlessly, to extend the substrate lengthwise, to provide a touch sensor, with very short touch sensing elements, of the type as shown in FIG. 9. Variants of this are shown in FIGS. 7 and 8. This dividing, cutting up and re-joining is not necessarily done with scissors or soldering irons, but is usually done in software, within a computer aided design/machining CAD/CAM system.

FIG. 7 illustrates a schematic diagram of a touch sensor 700 providing an extended sensing region 720 comprising a diagonal arrangement of conductive sensing elements 701-707. The sensing area 720 is generally rectangular in this example. For the most part, the geometry of the touch sensor 700 is similar to the touch sensor described previously with reference to FIG. 3. The sensing region 720 is bounded by edge regions 712-718, which have corresponding edge directions and relate to those described previously with reference to FIG. 3. In particular, the first edge region 712 extends in a first edge direction 723.

The plurality of conductive sensing elements comprises a first set of conductive sensing elements 701*a*-707*a* and a second set of conductive sensing elements 701*b*-707*b*. Each conductive sensing element of the first set of conducting sensing elements 701*a*-707*a* is configured to be electrically connected to a corresponding conducting element of the second set of conducting sensing elements 701*b*-707*b* at the first edge region 712. In this example, there is a direct electrical connection between such sensing elements within the first edge region 712. The direct electrical connection means that they are in galvanic contact. The corresponding conductive sensing elements of the first and second set of conducting sensing elements provide respective connected pairs of the plurality of conductive sensing elements. Each pair of conductive sensing elements is configured to be coupled to touch sensor circuitry by the at least one edge region. In the example illustrated in FIG. 7, an electrical connector 721 is provided and connected to the respective pairs of conductive sensing elements that are joined in the first edge region 712. For example, connection one of the electrical connector 721 is coupled to a first conductive sensing element 701*a* of the first set of conductive sensing elements and a first sensing element 701*b* of the second set of conductive sensing elements, which together provide one pair of conductive sensing elements.

The first conductive sensing element 701*a* of the first set of conductive sensing elements extends within the sensing region 720 in a direction that is transverse to a direction in which the first conductive sensing element 701*b* of the second set of conductive sensing elements extends. The first and second sets of conductive sensing elements also comprise conductive sensing elements (the fifth conductive sensing element 705*b* of the second set of conductive sensing elements and the second conductive sensing element 702*b* of the second set of conductive sensing elements) adjacent to the third and fourth edge regions 716, 718 which change direction at the edge regions. Such conductive sensing elements comprise a portion that extends in a direction that is transverse to a direction in which conductive elements in the other set extend and a portion that extend in the same direction as the corresponding conductive element in the other set extends.

There is no electrical connection (no galvanic conduction) between the different respective pairs of conductive sensing elements. For example, the first conductive sensing element 701*a*, 701*b* of the first and second sets of conductive sensing elements are not electrically connected to the third conductive sensing elements 703*a*, 703*b* of the first and second sets of conductive sensing elements. However, as shown in the illustrated example, the first conductive sensing element 701*b* of the second set of the conductive sensing elements crosses other sensing elements, including the third sensing element 703*a* of the first set of conductive sensing elements at a node. There is no direct electrical connection at the node, or elsewhere within the sensing region or edge regions between the different pairs of conductive sensing elements.

Providing an arrangement in which each pair of conductive sensing elements crosses any other element of the plurality of conductive elements no more than once provides a touch sensor arrangement avoiding ambiguity between detected signals and touch positions.

That is, if there is only one position associated with a crossing between the first pair of conductive sensing elements and the third pair of conductive sensing elements then the detection of a signal associated with a touch event adjacent to a node formed by the first and third pairs of conductive sensing elements results in a signal that can be unambiguously associated with a single touch position.

In most touch sensing situations, where a conductive element "a" crosses a second conductive element "b", it is impossible to distinguish the difference, without ambiguity, between: a) a" being the controlling element while "b" is the sensing element, and b) "b" being the controlling element while "a" is the sensing element. In such a situation, pairs of conductive elements may not cross each other more than once inside the touch sensing zone.

Where it is possible to distinguish between situation a) and b) described above, then it is possible for the pairs of conductive elements to cross each other more than once.

Table 3 provides a truth table showing the arrangement of sensing node for the touch sensor 700 of FIG. 7 with respect to connections (1-7) of the electrical connector 721.

TABLE 3

Truth table for 7 inputs diagonal touch sensor

| | 1 | 2 | 3 | 4 | 5 | 6 | 7 |
|---|---|---|---|---|---|---|---|
| 1 | | X | X | X | X | X | X |
| 2 | X | | X | X | | X | X |
| 3 | X | X | | X | X | X | X |
| 4 | X | X | X | | X | X | X |
| 5 | X | | X | X | | X | X |
| 6 | X | X | X | X | X | | X |
| 7 | X | X | X | X | X | X | |

Joining the top half of the screen to the side of the bottom half, halves the length of all of the tracks, but with the consequence that it changes the aspect ratio from 1:1 to 0.5:2 (or 1:4).

The tracks, in the original 1:1 touchscreen were all equal in length to the diagonal of the touchscreen: square root 2 or 1.414 units. In the new touchscreen this has been halved to 0.707 units.

An x/y touchscreen, with an aspect ratio of 1:4 has a maximum conductor length of 4 units. Therefore, the sensing element length in a 1:4 aspect ratio diagonally wired touchscreen is only (1.414)/4 or 35% as long as the horizontal sensing element in a 1:4 aspect ratio x/y wired touchscreen. However, it is (1.414)/1 or 41% longer than the vertical element.

Since the maximum sensing route, for a particular signal is the sum of one horizontal and one vertical element, in an x/y layout, and the sum of two diagonal elements in a diagonal layout, the maximum sensing route in a 1:4 aspect ratio is: 5 for x/y and 2.828 for diagonal. Therefore, in such a situation, the maximum sensing route in the diagonally wired touchscreen is only 57% as long as the maximum sensing route in a touchscreen with an x/y layout.

Positions of the touch sensor in which the first set of conductive sensing elements seamlessly crossover and form sensing nodes with the second set of conductive sensing elements can be considered as merge points.

The touch sensor 700 of FIG. 7 has two merge points. At a first merge point, the second conductive sensing element 702*a* of the first set of conductive sensing elements crosses the sixth sensing element 706*b* of the second set of conductive sensing elements. At the second merge point, the seventh conductive sensing element 707*a* of the first set of conductive sensing elements crosses the first conductive sensing element 701*b* of the second set of conductive sensing elements, and the fifth conductive sensing element 705*a* of the first set of conductive sensing elements crosses the third conductive sensing element 703*b* of the second set of conductive sensing elements.

In this example, a printed circuit board is provided in the first edge region 712. The conductive sensing elements are connected to the PCB and extend through the sensing region. The connections within the first edge region 712 may be provided by traces on the PCB.

FIGS. 8 and 9 relate to touch sensors 800, 900 having different merge points to those of the touch sensor 700 of FIG. 7.

The touch sensor 800 of FIG. 8 also has two merge points which are similar to those described previously with reference to FIG. 7. However, in this example the screen is truncated. The touch sensor 800 comprises first and second sets of conductive sensing elements as described previously with reference to FIG. 7. In addition, in this example, the touch sensor further comprises sensing elements that are not paired. That is, in this example, the plurality of sensing elements comprises a fourth conductive sensing element 804 and a fifth conductive sensing element 805 in addition to the pairs of conductive sensing elements defined by the first and second sets of conductive sensing elements.

As described previously, it will be appreciated that the touch sensor 900 may be formed by drawings a track for a larger touch sensor and dividing it in two. These two halves can then be joined together, off screen, by a thin flexible, low resistance PCB, and routed to one common connector.

The touch sensor of FIG. 9 comprises a single merge point. In this example, the sensing elements of the first set of sensing elements enter the sensing region 920 in a first block and the sensing elements of the second set of conductive sensing elements enter the sensing region 920 in a second block that is next to the first block. At the merge point, the fifth sensing element 905*a* of the first set of conductive sensing elements crosses the third sensing element 903*b* of the second set of conductive sensing elements. Further, at the merge point, the seventh conductive sensing element 907*a* of the first set of conductive sensing elements crosses the first sensing element 901*b* of the second set of conductive sensing elements.

FIG. 9*a* differs from FIG. 9 in that another set of conductive elements, connected to another connector have been merged into the touch sensor in order to increase the length of the touch sensor. This touch screen comprises a plurality of first sensing element with pairs of conduct sensing elements (connected to the first electrical connector) and a second plurality of sensing elements that are not in pairs (connected to the second electrical connector).

In the arrangement of the touch sensor described previously with reference to FIGS. 7 to 9*a* the first set of conductive sensing elements is directly connected to the second set of conductive sensing elements in the first edge region, and a single electrical connector is coupled to the respective pairs of conductive elements via the first edge region. These screens can be joined in a wide variety of ways, one beside the other, one in the middle of the other, with an incomplete screen, with some of the top eliminated, with additional inputs included, etc. The connector can be positioned anywhere along the bottom edge of the touchscreen.

FIG. 10 illustrates a touch sensor with an alternative connector arrangement for providing a first set of conductive elements 1021 that is configured to be electrically connected to corresponding conductive elements of a second set conductive sensing elements. In this example, the first set of conductive sensing elements are connected to a first connector by the first edge region 1012. The second set of conductive sensing elements are coupled to a second electrical connector 1022 via the first edge region. The first set of conductive sensing elements and the second set of conductive sensing elements may be connected to one another using external circuitry that is coupled to the first and second electrical connectors 1021, 1022. In general, two or more electrical connectors can be used, which may be identical to one another. FIG. 10 is identical to FIG. 9 except that the paired touch sensing elements are electrically joined externally.

The original diagonal 1:1 touchscreen could be cut down into thirds or quarters, each being merged side by side to form one long touchscreen, the height of the sensing element being reduced further at each step. In this way, triplets, quadruplets or any plurality of sensing elements can be connected together for a corresponding number of sets of sensing elements.

In general, the crossing wires are transverse at the point where they cross but are not necessarily perpendicular to one another. Instead of the conductive elements crossing at 90 degrees, they could cross at other angles, such as 60 degrees. This would reduce the aspect ratio and reduce the length of the sensing elements from 1.414 times the minimum dimension (or height) of the screen to 1.2 times the minimum dimension (or height). They could also be aligned asymmetrically to the edges of the screen. These diagrams illustrate some, but not all of the wide range of connectors, connector positions, and node variations possible with this layout.

FIG. 11 illustrates a profile of resistance of a diagonal touch sensor of the type described with reference to FIG. 7 compared to a conventional x/y touch sensor as a function of aspect ratio. The profile shows that the advantages of diagonal wiring over standard x/y wiring increases as the aspect ratio of the touchscreen increases.

For example, in a standard 1:4 aspect ratio x/y wired touchscreen, the horizontal sensing elements would all be 4 units long, whereas in this 1:4 aspect ratio diagonal touchscreen, all the sensing elements are 1.414 units long.

There is a 41% increase in the resistance of the shortest sensing elements in an x/y touchscreen, and a 65% reduction in the resistance of the longest touch sensing elements.

If this touchscreen was 1 metre high by 4 metres long, and each of the sensing elements was 1 cm wide, then the maximum resistance of a metal mesh sensing element (at 15 ohms/square) would be 141.4 cm×15 ohms (2.1 Kohms), whereas its resistance, in a standard x/y touchscreen, would be 400 cm×15 ohms (6 Kohms).

Such a touchscreen would be functional using the extended diagonal wiring method but may be unworkable using the standard x/y wiring method.

In practice, however, the signal has to pass along the transmitting element and back through the receiving element. The maximum route of the signal, in the above 1×4 metre touchscreen would, therefore, be 2.828 (1.414+1.414) metres in the diagonally wired touchscreen and 5 (1+4) metres in the x/y touchscreen, an improvement in favour of the diagonal touchscreen of 44%.

FIG. 14 shows a touchscreen formed using fine insulation coated wires. these are formed into loops which terminate at individual terminal pins. A similar situation is shown in FIG. 15 but, this time, using a material like metal mesh.

When the conductive elements are "looped" as shown in FIGS. 14 and 15, then the resistance is halved, since two identical resistors wired in parallel have half the resistance of each individual resistor. The maximum route of the signal, in the above 1×4 metre touchscreen would still be 2.828 metres long, but its resistance would be halved, making an improvement in favour of the diagonal touchscreen of 72%.

For higher aspect ratio touchscreens, if the height of the touchscreen stays the same, but the length increases, the resistance of the sensing elements in the diagonal system stays constant at 1.414×the height of the touchscreen. This means that the touchscreen can be extended, almost indefinitely with no resistance problems restricting further extension. Therefore a touchscreen could be 30 or more metres long and would still work well. In this example, with a height of 1 metre and a length of 30 metres, but without "looped" conductive elements, the resistance ratio comparing diagonal layout with x/y layout is would be 2.828 vs 31—a 91% reduction in the resistance. With "looped" conductive elements, the resistance of the diagonal conductive elements is only 4.5% of the resistance of its x/y equivalent.

This shows that the "extended diagonal" wiring method disclosed herein may be used to provide large scale functional touch screens, almost without limitation in terms of length.

Manufacture Methodology Using Standard Metal Mesh Film

Metal mesh film can be purchased with the mesh already printed on both sides of a single film, already slightly offset, one surface against the other and with tracks already etched in the desired pattern, at right angles to each other. At the left and right edges of the screen, the top and bottom tracks need to be joined together electrically, in the appropriate positions, by "cutting" or drilling a small hole in the film and filling this hole with clear conductive ink. This same process can be used for connecting already linked conductive elements where they cross over each other at the top edge of the screen.

The metal mesh patterning can be laser ablated along the bottom edge of the screen and the remaining non-conductive plastic base layer can be ink-jet, 3d printed, or screen printed, with conductive ink traces, which join appropriate tracks together including those going to the connector. Any tracks that run over other tracks can be insulated from each other by over-printing the cross-over points with non-conductive dielectric ink.

Manufacture Methodology Using Fine, Insulation Coated Wire

The manufacturing method is much simpler when using fine insulation coated wire, as the wires can run over each other at the intersections without short circuiting. The wire may be enamel coated copper or tungsten, for example. The wire may have a diameter range from 5 microns to 50 microns or more, and more preferably from 3 microns to 17 microns, if it is to be invisible to the eye.

A method for forming a wire structure was disclosed in WO 2015/185879 A1, incorporated herein by reference in its entirety.

All the wires may be provided on the same surface, so there is no need to change surfaces at the edges. At the expense of increasing the resistance of the sensing elements, the tracks in the touchscreen can run directly to the connector, with each wire joining, at roughly its mid-point, to a single terminal pin. This eliminates the need for an interconnecting PCB.

FIG. 12 illustrates a touch sensor in which each conductive element comprises a single, fine insulation coated wire consisting of a sensing portion and a connection portion. In the drawings, a sensing portion 1201*ai* and a connecting portion 1201*aii* of a first conductive element of the first set of conductive elements is shown for clarity.

FIG. 12*a* illustrates a touch sensor that is similar to that of FIG. 12 and in addition comprises electrical connections, provided in a second edge region, between respective pairs of electric conductors. In this way, each pair of electrically conductive sensing elements is provided in a respective loop. Each sensing element consists of a single wire connected to a terminal pin, this wire consisting of a first connection portion, then a sensing portion, then a connection portion, followed by a further sensing portion, and a final connection portion that terminates at the same, original terminal pin.

Wire touchscreens are readily truncated, if required, as shown in FIG. 13. This shows the second wire of pin 5, in FIG. 12, has been eliminated, leading to the loss of two touch nodes at the far left of the screen, this reduces the number of nodes from 20 to 18. This has involved the consequential re-routing of one of the two wires connected to pin 4.

FIG. 14 illustrates a schematic diagram of a fine wire touch sensor 1400 with diagonally extending conductive sensing elements. In this example, most of the wires form a loop. For example, a single wire runs from pin 3, through the "not touch sensing region", up and right to the right hand end of the bottom edge of the "sensing region", diagonally left up through the "sensing region", then continues diagonally down through the "sensing region" again, and back down through the "not touch sensing region", returning to pin 3, in a loop. Wires connected to pins 2, 5 and 7, however, either have to join together by running across the top of the screen, or, as shown in FIG. 14, take an alternative route, running down the edges of the screen and back to their respective terminal pins. One of the loops for the wire connected to pin 2, and one of the loops for the wire connected to pin 5, are incomplete, as these wires only run through a short part of the bottom left and bottom right corners of the screen and, therefore are considered not in need of having their length shortened.

Looping the wire like this this has the major beneficial effect of halving the resistance of the conductive sensing elements.

Wires at the right and left edges of the screen do not have routes back through the "sensing region" and so have to travel back to their respective terminal pins through an extended "not touch sensing regions" at the edges of the screen, in the third and fourth edge regions 1416 and 1418 in this example. In this way, all the wires in the screen form loops, thereby halving their resistance.

FIG. 15*a* illustrates a schematic diagram of a standard x/y layout of conductive elements 1502 similar to those shown in FIGS. 1 and 2. It can be challenging to form such x/y layouts into 3-dimensional shapes due to the conductive element layout having conductive elements along two sides. If such an arrangement was formed into a 3D shape, such as a cylinder 1504, conductive elements would protrude from the side of the cylinder. This may be undesirable. In order to avoid the need for connections along the edge of a cylinder, there would need to be conductive elements along the length of the cylinder 1506 that are bussed to the end of the cylinder 1506 such that they are on the same edge as the vertically extending conductive elements. However, the addition of bussed conductive elements may interfere with the functionality of the cylindrical touch sensor 1506.

A method and apparatus for forming a wire structure are disclosed in GB2541336A (Binstead). As a modification to that method, a drum plotter, as opposed to a flatbed plotter, could be used to plot wires onto a cylinder, forming a touch sensing cylinder.

FIG. 15*b* illustrates a schematic diagram of another touch sensor 1500 possibly made of a material such as metal mesh, with diagonally extending conductive sensing elements which may be suitable for forming into a 3-dimensional shape without the disadvantages of the layout shown in FIG. 15*a*. The illustrated arrangement of nodes allows 21 nodes to be provided by 7 conductive elements. In this example also, some of the conductive elements within each pair of conductive elements are connected together at the second edge region 1514 that opposes the first edge region 1512. This halves the resistance of the conductive elements that form these loops. Conductive elements, at the third and fourth edge regions are not shown forming loops. This would normally result in these conductive elements having a higher resistance than the looped elements. However, it is possible to connect the conductive elements, in the third and fourth edge regions, electrically together, thereby completing the loops for these elements and creating a continuous touch sensing cylinder.

A feature of this arrangement is that, by connecting the third and fourth edge regions seamlessly together in a cylinder, a continuous touch sensing cylinder is formed:

Conductive element 7, at the third edge, electrically joins conductive element 7 at the fourth edge, completing a loop.

Likewise, conductive element 5, at the third edge, electrically joins conductive element 5 at the fourth edge, completing a loop.

And conductive element 2, at the third edge, electrically joins conductive element 2 at the fourth edge, completing a loop.

Furthermore:

Conductive element 1, at the first edge, electrically joins conductive element 1 at the second edge, completing a loop.

Conductive element 3, at the first edge, electrically joins conductive element 3 at the second edge, completing a loop.

Conductive element 4, at the first edge, electrically joins conductive element 4 at the second edge, completing a loop.

Conductive element 6, at the first edge, electrically joins conductive element 6 at the second edge, completing a loop.

By providing all conductive edges originating at the first edge, the touch sensor can be readily formed into a three dimensional shape (in the Cartesian coordinate system), such as a cylinder.

FIG. 15*c* provides a simple example of how another touch sensor 1516 can be formed into a cylindrical arrangement 1518, 1520. When the surface of the touch sensor is viewed in a flat projection 1516, each of the conductive elements that intersect with the third edge continues over to the fourth edge such that, when the third and fourth edges are joined seamlessly, each of the conductive elements wrap around the cylindrical touch sensor from front 1518 to back 1520. In an example such as that of FIG. 15*b*, the provision of 8 inputs may result in a total of 16 nodes formed at the intersections of the conductive elements. While it is discussed herein that the touch sensor 1516 may be shaped into a cylinder by way of joining the edges, it will be appreciated that one or more other three-dimensional shapes may equally be formed by joining said edges and together. In each case, the surface of the touch sensor forms a continuous surface by connection of the third edge with the fourth edge.

FIG. 16 illustrates a schematic diagram of another insulated wire based touch sensor 1600, similar to FIG. 14 but with the edge wires looped back on themselves within the touch sensing region as opposed to being looped back outside the touch sensing zone in FIG. 14. with diagonally extending and looped-back wire conductive sensing elements within a touch sensing area. Here, the illustrated arrangement of nodes also allows 21 nodes to be provided by 7 conductive elements. In this touch sensor 1600, three elements run, or are looped back through, through each of a subset of touch sensing nodes, thereby reducing resistance over alternative solutions where sensing elements are attached once only to the connector. While light transmission through the nodes having three elements may be reduced compared to light transmission through the nodes having two elements, this may be offset by improved touch sensitivity and/or ease of manufacture.

FIG. 17 corresponds to FIG. 15*a* but with the edge elements looped back to the connector area. via the third and fourth edge regions thereby completing their looped tracks. FIG. 17 illustrates a schematic diagram of another touch sensor 1700 with diagonally extending conductive sensing elements within a touch sensing area. Here, the illustrated arrangement of nodes also allows 21 nodes to be provided by 7 conductive elements. In this example, elements that meet the third 1716 or fourth edge regions 1718 are looped back to an electrical connector 1721 through a "no touch sensing area". This touch sensor 1700 may also reduce resistance as discussed for the touch sensor of FIG. 16.

The conductive sensing elements may be inkjet printed directly onto the touch-screen film, which would make the touch sensor simpler to manufacture than having a separate flexible PCB.

FIGS. 18 and 19 illustrate further touch sensors 1800 and 1900 using wires within the touch sensing region, these wires, however, are not used in the connection region, due to their high resistance, conductive traces being a lower resistance alternative. Here, some or all of the conductive sensing elements are looped-back within the touch sensing area. By virtue of every sensing element being looped within the sensing region, the touch sensor 1900 shown in FIG. 19 may lower the resistance of the sensing elements.

LED and Keypad Arrays

Although there is not normally a resistance problem with LED and Keypad arrays, the diagonal wiring methods used in this patent application apply to them as well. Due to the diagonal layout providing more unique cross-over nodes for a fixed number of inputs/outputs, a simpler wiring layout, with less connectors, all connections being along one edge only, as well as reduced resistance. Instead of providing a touch sensor with sensing nodes, a similar conductor pattern can be used to power LEDs at the position of the sensor nodes. If these arrays become very large, then resistance could start to become a problem. The methods described in this application may resolve such issues.

An added advantage of LEDs is that they only conduct in one direction. This means that the diagonal wiring method can address twice as many LEDs simply by having two oppositely conducting LEDs fitted at each and every intersection. A 7 output LED driver can then independently address any or all of 42 separate LEDs during a single scan.

As with touch sensors, led displays can be extended almost indefinitely if using the diagonal layout described herein, as track resistance does not increase with length.

These LEDs could form a very large, long LED Display, as used in Video Walls. These would work well with the touchscreen sensors described in this patent application, forming a continuous Touch Interactive Video Wall with no visual or touch sensing breaks that are often associated with commonly used tiled LCD Displays and multiple smaller discrete touchscreens.

If keys are fitted in series with diodes and arranged in opposing pairs at every intersection, then any one or all of 42 keys in such a diagonally wired keypad array, could be sensed by 7 inputs. In this way, LED and Keypad arrays can be connected with diagonal wiring, thereby reducing the number of inputs or outputs required.

FIG. 20 illustrates a schematic diagram of a wiring layout 2000 for use with LEDs 2021, 2022 and keypads that relates to the touch sensor layout of FIG. 17, where two touch sensor as illustrated in FIG. 17 are merged side-by-side. The wiring layout 2000 allows duplicate cross-over points if the LEDs are oppositely orientated, or for keys switches if switch-diode series pair combinations have oppositely orientated diodes.

For example, if two oppositely orientated LEDs 2021, 2022 are sited at otherwise seemingly ambiguous corresponding intersections they can each be illuminated separately by reversing the power supply polarity on the associated connector pins. If output 4 is positive and output 6 is negative, then LED1 2021 will light up. If output 4 is negative and output 6 is positive, the LED2 2022 will light up. Neither LED 2021, 2022 will light up for any other combination of outputs.

If a switch was placed in series with led1, and another switch was placed in series with led2, then, if either, both or neither switch is pressed, it is possible to detect exactly which switches have or have not been pressed, by detecting if current flows, or not, under suitable power supply conditions. For example, if output 4 is positive and output 6 is negative, then detectable current will flow if the switch, in series with led1, is pressed. if that switch is not pressed then no current will be detected. Whether the switch, in series with LED2, is pressed or not, makes no difference, as, under these circumstances, no current can flow due to led2 being orientated in the wrong direction.

A similar, but reverse situation occurs if output 4 is negative and output 6 is positive. this time only the switch connected in series with LED2 will be detectable, while whatever happens to the switch connected to LED1, it will have no effect. If used simply as a switch array, then then simple diodes can be used instead of LEDs. under these circumstances, due to there being absolutely no ambiguity, each conductive element can cross any of the other conductive elements twice. if it is possible that three or more conditions have to be met before a switch is detected, or in effect is enacted, then each conductive element can be allowed to cross any of the other conductive elements three or more times.

Furthermore, in FIG. 20, each of the input tracks is divided into four tracks, instead of two. Each connection of the electrical connector is connected to four sensing elements within the sensing region. In principle, 42 separate LEDs (and/or 42 separate touch sensing points) can be individually driven from just 7 output pins. That is, 42 LEDs may be uniquely addressed using 7 external electrical connections.

The sides of the wiring layout 2000 may be joined to form a substantially cylindrical conductive array.

FIG. 20 shows that 2 LEDs, connected to the same two terminals, are independently controllable, if the LEDs are orientated in opposite directions to each other. If the display has "in cell" touch sensing, where there is a touch dedicated, possibly infra-red light transmitter and a "IR" light detector in each pixel, then Light will only be reflected back from a finger if there is a finger present when the those "IR" LEDs are illuminated. An LED displays with "in cell" touch sensing, where light reflected back from a finger is used to determine if a touch has occurred. If there is reflection when "IR" LED1 is illuminated, then the finger is at LED1 position. If there is reflection when "IR" LED 2 is illuminated, then the finger is at LED2 position. If there is reflection when both LED1 and LED 2 are illuminated, then there are fingers is at both LED 1 and LED 2 positions. If there is no reflection when both LED1 and LED2 are illuminated, then there are no fingers at either LED1 or LED2 positions.

FIG. 20*a* illustrates a schematic diagram of a wiring layout 2100 for use with LEDs 2121, 2122 that relates to the wiring layout of FIG. 20. For example, the sides of the wiring layout 2100 may also be joined to form a substantially cylindrical conductive array. For example, the third edge region (A-C) may be seamlessly merged with the fourth edge region (B-D). A distinction compared to the wiring layout of FIG. 20 however is that no area is adapted for use as a touch screen: whereas FIG. 20 shows a distinction between the (shaded) touch area and the (not shaded) routing (i.e., no touch) area, there is no such distinction for a purely LED display, as there is no touch area.

In an alternative example, one or more light detectors may be sited among LEDs of an LED display (e.g., on one or more conductive element cross-over points) and configured to detect light reflected from the conductive elements. The one or more light detectors may be implemented alongside touch sensors, e.g., as described in relation to FIG. 20, to provide a multi-functional detector array.

FIG. 21 illustrates a schematic diagram of a wiring layout 2200 for use in creating a dual function screen, with touchscreen and low-resolution display all addressed from the same 7 pin connector. Here, the connector pins may be inputs some of the time and outputs at other times.

The wiring layout 2200 is the same as for the touch sensor of FIG. 12 and may operate in the same way as a conventional touchscreen. Electro-luminescent phosphor dots 2231, 2232 in this example, are, however, over-printed on the intersections of the wires so as not to disturb their touch sensing function.

When the wiring layout 2200 is not used to sense touch, voltage signals may be applied to the various connector pins. If two wires at any intersection, e.g., the wires coupled to pins 1 and 6, have a sufficiently high voltage difference between them, this will cause the corresponding electroluminescent phosphor dot 2231 to glow. The higher the voltage difference, the brighter the dot glows. The display can be scanned in the same way as a touchscreen is scanned, causing the whole screen to act as a display.

This shows how our wiring layout can be used to create a dual function screen, with touchscreen and low resolution display, all addressed from the same 7 pin connector. The connector pins must be inputs some of the time and outputs at other times. The layout is similar to that illustrated in FIG. 12, and works as a conventional touchscreen. Electroluminescent phosphor dots are, however, over-printed on the intersections of the wires. This does not disturb their touch sensing function. Alternating with this touchscreen function is the display function. When not bring used to sense, reasonably high voltage signals are placed on various pins. If the two wires at any intersection have a sufficiently high voltage difference between them, this will cause the phosphor dot to glow. The higher the voltage difference, the brighter the phosphor glows. The display can be scanned in the same way as the touchscreen is scanned, causing the whole screen to act as a display.

FIG. 21B shows a schematic diagram of a further touch sensor with a plurality of conductive elements that each extend in a diagonal direction from a first edge region to one of the second, third or fourth edge regions. In this example there are just 10 unique diagonal conductor intersections and no intersections in the top left or right corners of the sensing region.

FIG. 21C shows a further schematic diagram of a touch sensor where the number of intersections has been increased by splitting each conductive element into a first sensing element and a second sensing element. Each pair of sensing elements diverge from one-another at an angle which may be a right angle but could be any other angle between about 10 degrees and about 90 degrees. To take conductive element 5 as an example, a first sensing element extends from the first edge to the top right of the sensing element and a second sensing element extends from the first edge to the top left of the sensing element. This arrangement provides a maximum of 28 unique intersections (nodes) from 8 connections. It can be noted that there are no intersections in the top left and top right corners of the sensing region.

FIG. 21D shows a yet further schematic diagram of a touch sensor where the number of intersections has been increased by adding single unsplit conductive elements 2241 along the left and right edges of the sensing region. In this embodiment, 23 out of a possible 28 unique intersections are achieved and the entire sensing region is evenly filled with unique intersections. This provides an example of how both split and unsplit conductive elements may be beneficially used together in some embodiments.

In the embodiments of FIGS. 21C and 21D, the split conductive elements 2242 are split into duplicates at a single point at the first edge of the sensing region. In contrast, the conductive elements 1, 2 and 3 of the embodiment shown in FIG. 21D may be connected via an edge region outside of the sensing region and enter the sensing region at different points. In yet further examples, one or more of the conductive elements may be split into three, four or more sensing elements.

Previously presented embodiments have shown how diagonal conductive elements can be used to increase a number of intersections in a matrix, and/or reduce the number of connections required. These connections can be single conductive elements, conductive elements split into separate sensing elements or a combination of these may be used. The matrices of conductive elements may have terminations at the end or be looped to form a tube. The length of the conductive elements in the active area of the matrix is dependent on the height of the matrix but, beyond a certain point, is independent of the matrix's width. If the conductors are at right angles to each other in a diagonal arrangement, such as in the embodiments disclosed herein, then the maximum conductor length is about the square root of two (1.414) times the height of the matrix. This means that, no matter how wide the matrix gets, after a certain point, the conductors do not get any longer and their resistance is constant.

FIG. 22*a* illustrates a schematic diagram of an extended x/y touch sensor 2310. The advantages of diagonal conductive element arrangements is in marked contrast to an x/y matrix, such as that shown in FIGS. 22*a*, in which the conductive element length, and therefore the conductor resistance, continuously increases with increasing width. In such an x/y touch sensor 2310, a single is applied at both ends of the horizonal conductor more vertical conductive elements are added. This will work to some extent, but eventually there will come a limit beyond which the touch sensor 2310 will not function properly due to the greatly increased resistance of the horizontal conductors.

FIG. 22*b* illustrates a schematic diagram of a further touch sensor 2300 with a diagonal array of conductive elements 2334, 2335, 2336 coupled to a plurality of electrical connectors 2337, 2338, 2339. The conductive element with reference sign 2334 is representative of a first plurality of conductive elements coupled to a first electrical connector 2337. Similarly, the conductive elements with reference signs 2335 and 2336 are representative of a second and a third plurality of conductive elements coupled to a second 2338 and a third electrical connector 2339, respectively. The first and third pluralities of electrical connectors may be considered to provide a combined pluralities of electrical connectors. Three connectors are shown here, but these might, for example, be one large connector. The second plurality of conductive elements, however, each split into two sensing elements—see the sensing element 2335 emphasised in thick lines, for example. In this example, each conductive element of the second plurality of conductive elements comprises a pair of sensing elements that are directly (galvanically) connected together at a first edge region 2312 such that the pair of sensing elements diverge from a single point. The pair of sensing elements of a conductive element of the plurality of conductive elements extend in opposing directions and do not cross one another within the sensing region.

The conductive elements of the first, second and third pluralities of conductive elements cross at 90 degrees to each other to define a sensing area in this example. That is, the conductive elements that cross one another extend in perpendicular directions.

The wiring layout shown in FIG. 22*b*, when compared to FIG. 7 for example, greatly simplifies the wiring required to link the sensing elements to their respective connector (defining a sensing region or area). In the schematic diagram of FIG. 22, the first 2337, second 2338 and third 2339 electrical connectors are located at the same, first edge region 2312 of the touch sensor 2330. The first 2337, second 2338 and third 2339 electrical connectors may alternatively be located at an edge region of the touch sensor 2300 other than the first edge region 2312. Furthermore, although shown in a horizontal orientation, the touch sensor 2300 could be used in any other orientation, and/or have an alternative aspect ratio to that shown.

FIG. 23 illustrates a schematic diagram of a further touch sensor 2400 that corresponds to the touch sensor of FIG. 22. Here the conductive elements cross at 60 degrees to each other to define the sensing area. That is, the second plurality of conductive elements each split into two sensing elements at 60 degrees to each other. In alternative examples the splitting angle may be from 10 degrees to 90 degrees, for example 20 degrees, 40 degrees or 80 degrees. The conductive elements may intersect the first edge region symmetrically, for example with a line symmetry extending in perpendicular direction to the first edge region, or asymmetrically.

The layout of the first and third pluralities of conductive elements is generally similar to the layout of the conductive elements shown in FIGS. 3-6. One difference is the angle at which each conductive element obliquely extends from the edge region at the which each conductive element couples to the respective electrical connector-compare the left-most conductive element in FIGS. 4 and 23. More generally, the conductive elements that cross one another may extend in transverse directions, and the pairs of conductive elements may extend in opposing, transverse directions.

FIG. 24 illustrates a schematic diagram of a further touch sensor 2500 that corresponds to the touch sensor of FIG. 22. The touch sensor 2500 shows how several touch sensors can be joined together by an intermediary plurality of sensing elements 2536 and electrical connector 2539 that correspond, for example, to the third plurality of conductive elements and third electrical connector shown in FIG. 22.

The touch sensor 2500 further shows electrical connectors 'Con1' 2540 and 'Con5' 2541. These electrical connectors may have the same connections as each other, or be connected together so as to form pairs of conductors. Furthermore, the electrical connector for each instance of a second plurality of conductive elements connects to the bulk of the sensing elements. All the connectors may be connected to a single processor. Alternatively each connector may be connected to a separate processor, or any combination in between. These processors may be totally synchronised, or work semi-independently, or work totally independently some of the time. Irrespective of the width of the sensing region, the maximum length of any conductors in the active area is the square root of two (1.414) multiplied by the height of the sensing region, even though the width of the matrix may be many times greater than this. More electrical connectors can be added or subtracted in order to either lengthen or shorten the touch sensor without changing the length of any of the conductor elements as originally provided. In this embodiment, the conductive elements of Con 2 2542 do not overlap with those of Con 4 2543. This enables the conductors of these two connectors to work independently without any detrimental consequences for the functioning of the overall touch sensor. As such, a touch sensor comprising connectors that can be attached to the same or different controllers can be provided, so long as they can synchronise with their immediate neighbours. These advantages are not realised in x/y arrangements such as that shown in FIG. 22*a* where x conductors always intersect with every y conductor and vice versa.

FIGS. 25*a* and 25*a* illustrate how a design of a conductor arrangement similar to that described previously with reference to FIG. 9 (shown in FIG. 25A) may be transformed into a conductor arrangement such as that described previously with reference to FIG. 22 (as shown in the upper portion of FIG. 25B).

As shown in FIGS. 25*a*, the sensing elements are connected into pairs at the first edge region 2512. As shown in FIGS. 25*a*, each pair of sensing elements is separated so that the respective pairs of sensing elements are, compared to FIG. 25*a*, no longer connected at the first edge region 2512.

As shown in the upper portion of FIG. 25*b*, the respective pairs of sensing elements have been joined at the second edge region 2514 to provide a structure similar to that described previously with reference to FIG. 22.

FIG. 26 illustrates stages in an example process of forming a three-dimensional touch sensor 2602 comprising a plurality of conductive element. Each conductive element is split into two sensing elements. In this example, 8 inputs produces 56 duplicated intersections, which, for some implementations, are uniquely distinguishable. Signal input may be received from the first edge (the bottom edge), the second end (the top edge) or from both the first and second edges. Such cylinders can be stacked on top of each other in order to form longer cylinders.

FIG. 27 illustrates stages in a further example process of forming a three-dimensional touch sensor 2704 comprising a plurality of conductive elements. Each conductive element is split into two sensing elements. In one or more embodiments, one or more of the conductive elements may be split into three, four or more sensing elements in a two-dimensional projection of the touch sensor 2700, which represents the touch sensor prior to forming into a three-dimensional sensor 2704. The two-dimensional projection 2700 is the same as the two-dimensional projection 2600 in FIG. 26. In this example, the split of the conductive element into two sensing elements is provided on a sensing region of the touch sensor or at an edge of the sensing region, where the edge of the touch sensor is an interface between the sensing region and an edge region. In other embodiments, the conductive element may be split into two or more sensing elements on an edge region and each sensing element may extend onto the sensing region independently at a same or different points along the edge of the sensing region. By splitting the conductive elements into two sensing elements, one obtains a total of 56 sensing element intersections which, in one or more embodiments, may be uniquely distinguishable.

The lower half of a cylinder 2702 such as that shown in FIG. 27 provides 24 unique intersections. Although a maximum possible number of intersections in such a configuration is 28, this geometry may not allow for all intersections to be available. For example, when using this geometry, an even number of inputs creates an odd number of rows. For example 8 inputs creates 7 rows of 8 intersections (56). Half of this is 3.5 rows of 8 intersections (28). Therefore, when the matrix is reduced by half, as in FIG. 2702, only three complete rows of 8 intersections (24 intersections) are left. Half a row is left over un-used.

All possible intersections are available if an odd number of inputs (conductive elements) is used, such as seven inputs which would give 21 intersections. In this example, the conductive elements extend onto the sensing region at a first edge (edge B-B of FIG. 26), a second edge opposes the first edge (edge A-A of FIG. 26) and third and fourth edges (edges A-B) connect the first and second edges. The third and fourth edges may be connected together in any suitable manner in order to form the three-dimensional touch sensor 2704. In other embodiments, the third and fourth edges may be coupled together prior to printing, depositing or otherwise applying the conductive elements to the sensing region. In yet other embodiments, the sensing region may be formed in a three-dimensional structure without the need to connect third and fourth edges together.

By providing three-dimensional touch sensors such as those shown in FIGS. 26 and 27, one is able to provide versatile devices that can be stacked on top of one-another in order to provide elongate cylinders.

FIG. 28*a* illustrates an example touch sensor comprising a plurality of elements 2801 which are each split into two sensing elements. In this example, conductive elements 4-8 are split either on the sensing region 2802 or at the interface between the sensing region 2802 and an edge region 2803 of the first edge. Conductive elements 1-3 2805 are split on the edge region 2803 and enter the sensing region 2802 at different points along the first edge. In this embodiment, the sensing elements of the split conductive elements 1-3 2805 are connected by low resistance tracks 2804.

FIG. 28*b* illustrates an example touch sensor that is equivalent to that of FIG. 28*a* but with an inverted arrangement. That is, parts of the conductive elements that were previously presented at the first edge (the bottom edge) are located at the second edge (top edge) in this embodiment. In this embodiment, the sensing elements of each conductive element are connected at the first edge of the touch sensor by low resistance tracks 2804. This results in a looped track which effectively halves the resistance of the conductor in the sensing region 2802. It will be appreciated herein that "low resistance tracks" refers to the resistance of the tracks on the edge region 2803 being lower than the resistance of the tracks in the sensing region 2802. By way of example, track 7 can be considered: the resistance from point "a" to "b" in FIG. 28*b* is designated to be very low. The resistance from point "a" to point "d" is also designated as very low. If the very low resistance is taken to have a zero resistance for the sake of this example, then: the resistance from point "a" to point "c" via "b" is 1.414 multiplied by the height of the sensing region (h); and the resistance from point "a" to point "c" via "d" is the square root of two (1.414) multiplied by the height of the sensing region. As the two resistors are in parallel, then the maximum conductor resistance, R, from point "a" to point "c" is equal to the square root of two divided by two (0.707) multiplied by the height of the sensing region. The same processes cannot be applied to conductive elements 1, 2 or 3 because these conductors are not looped. In other embodiments, conductive elements 1, 2 or 3 could be looped outside of the sensing region in a second edge region adjacent to the second edge of the sensing region. Such a looping would provide for a reduced resistance of these conductive elements. Similarly, the embodiment illustrated in FIG. 28*a* could have duplicated connections along the first and second edge regions, which would reduce the effective resistance even further to 0.35 multiplied by the height of the sensing region.

Throughout the present specification, the descriptors relating to relative orientation and position, such as "height", "width"; "horizontal", "vertical", "top", "bottom" and "side", are used in the sense of the orientation of the touch sensor or touch screen as presented in the drawings. However, such descriptors are not intended to be in any way limiting to an intended use of the described or claimed invention. Touchscreens are often used as table tops. In such a situation, the word height can be read as width.

It will be appreciated that any components that are described or illustrated herein as being coupled or connected could be directly or indirectly coupled or connected. That is, one or more components could be located between two components that are said to be coupled or connected whilst still enabling the required functionality to be achieved.

The invention claimed is:

1. A conductor arrangement comprising:

a functional region bounded by at least one edge region that extends in an edge region direction; and a plurality of conductor elements that each extend through the functional region obliquely to the edge region direction, wherein the plurality of conductor elements comprises a first set of conductor elements and a second set of conductor elements, wherein each conductor element of the first set of conductor elements is connected to a corresponding conductor element of the second set of conductor elements at the at least one edge region to provide respective connected pairs of conductive elements, wherein each connected pair of conductive elements is configured to be coupled to circuitry via the at least one edge region, and wherein a length of each conductor element of the plurality of conductor elements in the functional region is proportional to a height of the functional area and independent of a width of the functional area.

2. The conductor arrangement of claim 1, wherein the plurality of conductor elements further comprises a third set of conductor elements, wherein each conductor element of the third set of conductor elements is configured to be coupled to the circuitry via the at least one edge region.

3. The conductor arrangement of any claim 1, wherein, excluding internal pairing within any connected pair, each conductor element comes into juxtaposition with other conductor elements of any set within the functional region, including its own set, forming juxtaposed pairings of conductor elements thereby facilitating a function of the functional region.

4. The conductor arrangement of claim 3, wherein the juxtaposed pairings of conductor elements form a regular array.

5. The conductor arrangement of claim 1, wherein the conductor arrangement is configured to provide one or more sensors such as a touch sensor or a proximity sensor, wherein the functional region is a sensing region.

6. The conductor arrangement of claim 1, wherein the conductor arrangement is configured to provide a touchscreen, and wherein the functional region is a sensing and display region.

7. The conductor arrangement of claim 1, wherein the conductor arrangement is configured to provide one or more driven devices such as a display or a display screen, wherein the functional region is configured as a display region.

8. The conductor arrangement of claim 1, wherein the plurality of conductor elements comprises wire.

9. The conductor arrangement of claim 1, wherein the functional region is a square or a rectangle, or a 3D shape such as a cylinder.

10. The conductor arrangement of claim 9, wherein the cylinder is transformable into simple or complex 3-dimensional shapes.

11. The conductor arrangement of claim 10, wherein connected pairs of conductor elements form respective loops.

12. The conductor arrangement of claim 1, wherein the plurality of conductor elements terminate within one edge region of the at least one edge region.

13. The conductor arrangement of claim 12, wherein the plurality of conductor elements is arranged to terminate within a common area of the one edge region for coupling to a single connector, or within two or more areas of the one edge region for coupling to two or more respective connectors.

14. The conductor arrangement of claim 1, comprising at least one further conductor element that extends from a middle section of one edge region of the at least one edge region through the functional region, wherein the at least one further conductor element has a length no greater than a length of each conductor element of the plurality of conductor elements, such that a width of the functional region is increased without increasing the length of any conductor element of the plurality of conductor elements.

15. The conductor arrangement of claim 1, further comprising the circuitry, wherein the circuitry comprises at least one processor.

16. The conductor arrangement of claim 15, wherein the circuitry comprise a plurality of processors, in which the plurality of processors operate either synchronous or asynchronous with each other, or in which some of the plurality of processors operate independently of each other.

17. A conductor arrangement comprising:

a cylindrical functional region bounded by at least one edge region that extends in an edge region direction;

a plurality of conductor elements that each extend through the functional region obliquely to the edge region direction, wherein each conductor element is configured to be coupled to circuitry via the at least one edge region;

wherein the circuitry comprises a processor or a plurality of processors coupled to the plurality of conductive elements, wherein the plurality of processors are configured to operate either synchronously or asynchronously with each other, or in which some of the plurality of processors are configured to operate independently of each other.

18. A conductor arrangement comprising:

a functional region bounded by one edge region that extends in an edge region direction; and a plurality of conductor elements that each extend through the functional region obliquely to the edge region direction, at least two further conductor elements that extend from a middle section of one edge region of the at least one edge region through the functional region, each conductor element of the at least one pair of further conductor elements having a length no greater than a length of each conductor element of the plurality of conductor elements, such that a width of the functional region is increased without increasing the length of each conductor element of the plurality of conductor elements, wherein each conductor element is configured to be coupled to circuitry via the one edge region.

* * * * *